United States Patent

Jo et al.

(10) Patent No.: US 9,231,420 B2
(45) Date of Patent: Jan. 5, 2016

(54) CELL BALANCE CIRCUIT AND CELL BALANCE DEVICE

(75) Inventors: Hiroshi Jo, Saitama (JP); Kazuyuki Sashida, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 156 days.

(21) Appl. No.: 14/112,323

(22) PCT Filed: Dec. 26, 2011

(86) PCT No.: PCT/JP2011/007257
§ 371 (c)(1),
(2), (4) Date: Oct. 17, 2013

(87) PCT Pub. No.: WO2012/143985
PCT Pub. Date: Oct. 26, 2012

(65) Prior Publication Data
US 2014/0028263 A1 Jan. 30, 2014

(30) Foreign Application Priority Data

Apr. 19, 2011 (JP) .................................. 2011-092759
Oct. 5, 2011 (JP) .................................. 2011-221143

(51) Int. Cl.
*H02J 7/00* (2006.01)
*H01M 10/44* (2006.01)
*H01M 10/42* (2006.01)

(52) U.S. Cl.
CPC ........... *H02J 7/0031* (2013.01); *H01M 10/441* (2013.01); *H02J 7/0016* (2013.01); *H01M 2010/4271* (2013.01)

(58) Field of Classification Search
CPC ........................................................ H02J 7/0016
USPC ............................................................. 320/118
See application file for complete search history.

(56) References Cited

U.S. PATENT DOCUMENTS

| 2009/0278496 A1* | 11/2009 | Nakao et al. .................. 320/118 |
| 2010/0295510 A1 | 11/2010 | Moussaoui et al. |
| 2011/0103099 A1 | 5/2011 | Moki et al. |

FOREIGN PATENT DOCUMENTS

| JP | 2004-15843 A | 1/2004 |
| JP | 2004-88878 A | 3/2004 |

(Continued)

OTHER PUBLICATIONS

International Search Report for PCT/JP2011/007257, Apr. 17, 2012.

(Continued)

*Primary Examiner* — Edward Tso
*Assistant Examiner* — Ahmed Omar

(57) ABSTRACT

To provide a cell balance circuit and a cell balance apparatus with a low cost and with a compact size, and configured to equalize the charge voltages of rechargeable batteries when the rechargeable batteries are charged or discharged, while suppressing deterioration of the rechargeable batteries. A cell balance circuit AA includes a transformer T, a switch SW1 arranged so as to form a set with a rechargeable battery BT1, and a switch SW2 arranged so as to form a set with a rechargeable battery BT2. The transformer T includes a primary winding Wa arranged so as to form a set with the rechargeable battery BT1, and a secondary winding Wb arranged so as to form a set with the rechargeable battery BT2. When the rechargeable batteries BT1 and BT2 are charged or discharged, the cell balance circuit AA synchronously controls the switches SW1 and SW2.

5 Claims, 16 Drawing Sheets

(56) References Cited

FOREIGN PATENT DOCUMENTS

| | | | |
|---|---|---|---|
| JP | 2008-5630 A | 1/2008 | |
| JP | 2008-125273 | * 5/2008 | ............... H02J 7/02 |
| JP | 2008-125273 A | 5/2008 | |
| JP | 2009-55687 A | 10/2009 | |
| JP | 2009-247118 A | 10/2009 | |
| JP | 2010-104077 A | 5/2010 | |
| JP | 2010-288447 A | 12/2010 | |

OTHER PUBLICATIONS

International Preliminary Report on Patentability for PCT/JP2011/007257, Jul. 2, 2013.
State Intellectual Property Office of the People'S Republic of China, Office Action for Chinese patent application No. 201180070207.0, Mar. 26, 2015.

\* cited by examiner

US 9,231,420 B2

CELL BALANCE CIRCUIT AND CELL BALANCE DEVICE

TECHNICAL FIELD

The present invention relates to a cell balance circuit and a cell balance apparatus including multiple cell balance circuits.

BACKGROUND ART

With conventional techniques, in a case of employing multiple rechargeable batteries, such an arrangement requires a cell balance mechanism to equalize the respective charge voltages of the multiple rechargeable batteries. Thus, in some cases, a resistor is connected in parallel to each of the multiple rechargeable batteries. Such an arrangement allows a rechargeable battery having a higher charge voltage than those of the other rechargeable batteries to be discharged via the resistor thus connected in parallel. Thus, such an arrangement equalizes the respective charge voltages of the multiple rechargeable batteries.

However, such an arrangement in which a resistor is connected in parallel to each rechargeable battery has a problem of large power loss due to the discharging via the resistors. In order to solve such a problem, circuits have been proposed as disclosed in Patent documents 1 and 2.

CITATION LIST

Patent Literature

Patent Literature 1: Japanese Unexamined Patent Application Publication No. 2010-288447
Patent Literature 2: Japanese Unexamined Patent Application Publication No. 2004-88878

SUMMARY OF THE INVENTION

Technical Problem

The circuit disclosed in Patent document 1 employs diodes to equalize the charge voltages. With such an arrangement, the forward voltage of a diode changes in response to the temperature. Thus, in some cases, such an arrangement cannot accurately equalize the respective charge voltages of the multiple rechargeable batteries. Even if the change in the diode forward voltage in response to the temperature is negligible, the circuit disclosed in Patent document 1 equalizes the charge voltages only when the rechargeable batteries are charged. Accordingly, when the rechargeable batteries are discharged, this leads to a difference in the charge voltage between the rechargeable batteries. Thus, such an arrangement cannot stabilize the cell balance.

On the other hand, with the circuit disclosed in Patent document 2, there is a need to monitor the respective charge voltages of the multiple rechargeable batteries. Such an arrangement requires devices and circuits to monitor the charge voltages of the rechargeable batteries, which is a main factor impeding such a circuit from being manufactured with a low cost and/or with a compact size.

Furthermore, with the circuits disclosed in Patent documents 1 and 2, such an arrangement provides cell balancing after a difference occurs in the respective charge voltages of the multiple rechargeable batteries. In some cases, the charge voltage of a rechargeable battery reaches the range of deterioration, leading to deterioration of the rechargeable battery.

The present invention has been made in order to solve such a problem. Accordingly, it is a purpose of the present invention to provide a cell balance circuit and a cell balance apparatus configured with a compact size and with a low cost to equalize the charge voltages of the rechargeable batteries when they are charged and discharged while suppressing deterioration of the rechargeable batteries.

Solution to Problem

In order to solve the aforementioned problems, the present invention proposes the following items.

(1) The present invention proposes a cell balance circuit (which corresponds to the cell balance circuit BB shown in FIG. 5, for example) configured to equalize respective charge voltages of a first rechargeable battery (which corresponds to the rechargeable battery BT1 shown in FIG. 5, for example) and a second rechargeable battery (which corresponds to the rechargeable battery BT2 shown in FIG. 5, for example). The cell balance circuit comprises: a transformer (which corresponds to the transformer T shown in FIG. 5, for example) comprising a primary winding (which corresponds to the primary winding Wa shown in FIG. 5, for example) arranged so as to form a set with the first rechargeable battery and a secondary winding (which corresponds to the secondary winding Wb shown in FIG. 5, for example) arranged so as to form a set with the second rechargeable battery; and a switching unit configured to control a state of whether or not a charge voltage of the first rechargeable battery is applied to the primary winding, wherein the switching unit comprises a first switch (which corresponds to the switch Sa shown in FIG. 5, for example), a second switch (which corresponds to the switch Sb shown in FIG. 5, for example), a third switch (which corresponds to the switch Sc shown in FIG. 5, for example), and a fourth switch (which corresponds to the switch Sd shown in FIG. 5, for example), and wherein a second terminal of the primary winding and a first terminal of the secondary winding are each connected to a second terminal of the first rechargeable battery, and are each connected to a first terminal of the second rechargeable battery, and wherein the primary winding is arranged such that a first terminal thereof can be connected to a first terminal of the first rechargeable battery via the first switch, and such that the first terminal thereof can be connected to a second terminal of the second rechargeable battery via the second switch, and wherein the secondary winding is arranged such that a second terminal thereof can be connected to the first terminal of the first rechargeable battery via the third switch, and such that the second terminal thereof can be connected to the second terminal of the second rechargeable battery via the fourth switch, and wherein, when the first and second rechargeable batteries are charged or otherwise discharged, the first switch together with the fourth switch and the second switch together with the third switch are alternately switched on and off.

With the invention, the transformer and the switching unit are provided to the cell balance circuit configured to equalize the respective charge voltages of the first and second rechargeable batteries. Furthermore, the transformer includes the primary winding arranged so as to form a set with the first rechargeable battery, and the secondary winding arranged so as to form a set with the second rechargeable battery. Moreover, the switching unit is configured to control a state of whether or not the charge voltage of the first rechargeable battery is applied to the primary winding.

In addition, with the invention, the switching unit is arranged with the first switch, the second switch, the third switch, and the fourth switch. Furthermore, the second terminal of the primary winding and the first terminal of the secondary winding are each connected to the second terminal of the first rechargeable battery, and are each connected to a first terminal of the second rechargeable battery. Moreover, the primary winding is arranged such that a first terminal thereof can be connected to a first terminal of the first rechargeable battery via the first switch, and such that the first terminal thereof can be connected to a second terminal of the second rechargeable battery via the second switch. Furthermore, the secondary winding is arranged such that a second terminal thereof can be connected to the first terminal of the first rechargeable battery via the third switch, and such that the second terminal thereof can be connected to the second terminal of the second rechargeable battery via the fourth switch.

Thus, when the first switch and the fourth switch are each turned on, and the second switch and the third switch are turned off, the primary winding is connected to the first rechargeable battery via their both terminals, and the secondary winding is connected to the second rechargeable battery via their both terminals. In this state, the charge voltage of the first rechargeable battery is applied to the primary winding, and the charge voltage of the second rechargeable battery is applied to the secondary winding.

Furthermore, when the first switch and the fourth switch are each turned off, and the second switch and the third switch are each turned on, the primary winding is connected to the second rechargeable battery via their both terminals, and the secondary winding is connected to the first rechargeable battery via their both terminals. In this state, the charge voltage of the second rechargeable battery is applied to the primary winding, and the charge voltage of the first rechargeable battery is applied to the secondary winding.

When the charge voltage of the first rechargeable battery is applied to the primary winding, a magnetic flux occurs in the primary winding, which passes into the second winding. With the magnetic flux as $\Phi_B$, and with the number of turns of the secondary winding as N, an electromotive forces occurs in the secondary winding as represented by the following Expression (1).

$$\varepsilon = N \frac{-d\Phi_B}{dt} \quad \text{[Expression 1]}$$

With such an arrangement, the magnetic flux that occurs in the primary winding changes according to a change in the voltage applied to the primary winding. Thus, the electromotive force that occurs in the secondary winding changes according to a change in the charge voltage of the first rechargeable battery.

As with the primary winding described above, when the charge voltage of the second rechargeable battery is applied to the secondary winding, a magnetic flux occurs in the secondary winding, which passes into the primary winding. Thus, an electromotive force occurs in the primary winding as represented by the aforementioned Expression (1). With such an arrangement, the electromotive force that occurs in the primary winding changes according to a change in the charge voltage of the second rechargeable battery.

Description will be made below assuming that the number of turns of the primary winding is equal to that of the secondary winding, and that the charge voltage of second rechargeable battery is applied to the secondary winding. With the charge voltage of the first rechargeable battery as $V_{BT1}$, with the charge voltage of the second rechargeable battery as $V_{BT2}$, with the resistance component of the primary winding as $R_{W1}$, and with the resistance component of the secondary winding as $R_{W2}$, the current $I_{W1}$ that flows through the primary winding is represented by the following Expression (2), and the current $I_{W2}$ that flows through the secondary winding is represented by the following Expression (3).

$$I_{W1} = \frac{V_{BT2} - V_{BT1}}{R_{W1} + R_{W2}} \quad \text{[Expression 2]}$$

$$I_{W2} = \frac{V_{BT1} - V_{BT2}}{R_{W2} + R_{W1}} \quad \text{[Expression 3]}$$

When the charge voltage of the first rechargeable battery is equal to that of the second rechargeable battery, as can be understood from the aforementioned Expression (2), no current flows through the primary winding. Furthermore, as can be understood from the aforementioned Expression (3), no current flows through the secondary winding. Thus, current flows through neither the first rechargeable battery nor the second rechargeable battery.

When the charge voltage of the first rechargeable battery is lower than that of the second rechargeable battery, a current, which is represented by the aforementioned Expression (2), flows from the primary winding to the first rechargeable battery, until the charge voltage of the first rechargeable battery becomes equal to that of the second rechargeable battery. Thus, the first rechargeable battery is charged. Furthermore, a current, which is represented by the aforementioned Expression (3), flows from the second rechargeable battery to the secondary winding, until the charge voltage of the first rechargeable battery becomes equal to that of the second rechargeable battery. Thus, the second rechargeable battery is discharged.

When the charge voltage of the first rechargeable battery is higher than that of the second rechargeable battery, a current, which is represented by the aforementioned Expression (2), flows from the first rechargeable battery to the primary winding, until the charge voltage of the first rechargeable battery becomes equal to that of the second rechargeable battery. Thus, the first rechargeable battery is discharged. Furthermore, a current, which is represented by the aforementioned Expression (3), flows from the secondary winding to the second rechargeable battery, until the charge voltage of the first rechargeable battery becomes equal to that of the second rechargeable battery. Thus, the second rechargeable battery is charged.

As described above, the charge voltage of the first rechargeable battery and the charge voltage of the second rechargeable battery become equal. Such an arrangement does not require a diode required by the circuit disclosed in the aforementioned Patent document 1. Thus, such an arrangement allows the charge voltage of the first rechargeable battery and the charge voltage of the second rechargeable battery to be equalized with high precision.

Furthermore, such an arrangement is capable of operating the switching unit without detecting the charge voltages of the first rechargeable battery and the second rechargeable battery. Thus, there is no need to monitor the charge voltages of the first rechargeable battery and the second rechargeable battery. Thus, such an arrangement provides a cell balance circuit with a low cost and with a compact size.

In a case in which a resistor is connected in parallel with each of the multiple rechargeable batteries as described above, such an arrangement has a problem in that the current that can flow to the rechargeable battery is limited by the resistor. In contrast, the cell balance circuit according to the invention includes a transformer instead of such a resistor. The resistance values of the primary winding and the secondary winding are very small as compared with the resistance value of such a resistor. Thus, the transformer imposes only a very small limit on the current that can flow through each rechargeable battery, as compared with the limit imposed by the aforementioned resistors. Thus, such an arrangement employing such a transformer has an advantage of an increased current that can flow through the first and second rechargeable batteries, as compared with an arrangement having a configuration in which a resistor is connected in parallel with each of the first and second rechargeable batteries as described above.

With such an arrangement, a rechargeable battery such as the first and second rechargeable batteries is configured to output DC electric power. Thus, such an arrangement has a problem in that the transformer comprising the primary winding and the secondary winding saturates if the first and fourth switches are continuously turned on, or if the second and third switches are continuously turned on.

In order to solve such a problem, with such an arrangement according to the present invention, when the first rechargeable battery and the second rechargeable battery are charged or discharged, the first switch together with the fourth switch and the second switch together with the third switch are alternately turned on. Thus, every time the first, second, third, and fourth switches are switched on and off, the voltage polarity inverts at a first terminal of the primary winding with a second terminal thereof as a reference, and at a first terminal of the secondary winding with a second terminal thereof as a reference. Such an arrangement is capable of preventing the transformer from saturating.

Furthermore, according to this invention, as described above, the first switch together with the fourth switch and the second switch together with the third switch are alternately turned on. Such that when the first rechargeable battery and the second rechargeable battery are charged or discharged, by means of the switching unit, the charge voltage of the first rechargeable battery can be applied to the primary winding, and the charge voltage of the second rechargeable battery can be applied to the secondary winding. Thus, such an arrangement allows the charge voltages of the first and second rechargeable batteries to be equalized with high precision when the first and second rechargeable batteries are discharged, as well as when the first and second rechargeable batteries are charged, and the cell balance can be stabilized. Furthermore, when the first and second rechargeable batteries are charged or discharged, by applying the charge voltage of the first rechargeable battery to the primary winding and applying the charge voltage of the second rechargeable battery to the secondary winding, such an arrangement can suppress the occurrence of a difference in the charge voltage between the first rechargeable battery and the second rechargeable battery. Thus, such an arrangement protects the first and second rechargeable batteries from transiently reaching the range of deterioration, thereby suppressing deterioration of the first and rechargeable batteries.

(2) Also, the present invention proposes a cell balance circuit configured according to the cell balance circuit described in (1). With such a cell balance circuit, the number of turns of the primary winding is equal to that of the secondary winding.

Such arrangement according to the present invention is configured according to the cell balance circuit described in (1). With such an arrangement, the first and second windings are configured to have an equal number of turns. Thus, such an arrangement provides the same advantages as those described above.

(3) Also, the present invention proposes a cell balance circuit configured according to the cell balance circuit described in (1) or (2). With such a cell balance circuit, the cell balance circuit is monolithically configured with the first rechargeable battery.

Such arrangement according to the present invention is configured according to the cell balance circuit described in (1) or (2). With such an arrangement, the cell balance circuit and the first rechargeable battery are monolithically configured as a single unit. Thus, such an arrangement provides a compact-sized apparatus including the cell balance circuit and the first rechargeable battery.

(4) Also, the present invention proposes a cell balance circuit configured according to the cell balance circuit described in any one of (1) through (3). With such a cell balance circuit, the switching unit is configured as a non-resonant converter (see FIGS. 7 through 11, for example).

With such an arrangement according to the present invention configured based on the cell balance circuit described in any one of (1) through (3), the switching unit is configured as a non-resonant converter. Thus, by appropriately switching the switch elements included in the non-resonant converter, such an arrangement provides the same advantages as those described above.

(5) Also, the present invention proposes a cell balance circuit configured according to the cell balance circuit described in any one of (1) through (4). With such a cell balance circuit, the primary winding and the secondary winding are each configured such that they are wound around an iron core.

With such an arrangement according to the present invention configured based on the cell balance circuit described in any one of (1) through (4), the primary winding and the secondary winding are each configured such that they are wound around an iron core. Thus, such an arrangement allows the primary and secondary windings to generate a stable magnetic flux, as compared with an arrangement in which the primary and secondary windings are not wound around such an iron core, i.e., in which they are each configured as an air-core coil, and the cell balance can be stabilized with higher precision.

(6) Also, the present invention proposes a cell balance apparatus (which corresponds to the cell balance apparatus 1 shown in FIG. 6, for example) comprising multiple cell balance circuits according to any one of (1) through (5). With such a cell balance apparatus, the switching of the first switch, the second switch, the third switch, and the fourth switch is controlled in an asynchronous manner among the multiple cell balance circuits.

In a case in which such an arrangement includes multiple cell balance circuits each having the configuration described in any one of (1) or through (5), the multiple cell balance circuits are each arranged so as to form a set with a corresponding rechargeable battery, i.e., the first rechargeable battery or the second rechargeable battery, thereby equalizing the charge voltages of the first and second rechargeable batteries. Thus, there is no need to synchronize the switching operation of the first, second, third, and fourth switches among the multiple cell balance circuits.

With such a cell balance circuit according to the present invention comprising multiple cell balance circuit described in any one of (1) or through (5), the switching operation of the first, second, third, and fourth switches are controlled in an asynchronous manner among the multiple cell balance circuits.

Thus, such an arrangement allows the multiple cell balance circuits to independently perform a switching operation of the first, second, third, and fourth switches. That is to say, there is no need to synchronize the switching operation of these switches among the multiple cell balance circuits. Such an arrangement allows the switching operation to be performed in a simple manner. Furthermore, such an arrangement facilitates the design of the cell balance apparatus.

(7) The present invention proposes a cell balance circuit (which corresponds to the cell balance circuit KK shown in FIG. 12, for example) configured to equalize respective charge voltages of a first rechargeable battery (which corresponds to the rechargeable battery BT1 shown in FIG. 12, for example) and a second rechargeable battery (which corresponds to the rechargeable battery BT2 shown in FIG. 12, for example). The cell balance circuit comprises: a first transformer (which corresponds to the transformer T1 shown in FIG. 12, for example) comprising a first primary winding (which corresponds to the primary winding W11 shown in FIG. 12, for example) and a first secondary winding (which corresponds to the secondary winding W12 shown in FIG. 12, for example) arranged so as to form a set with the first rechargeable battery; a second transformer (which corresponds to the transformer T2 shown in FIG. 12, for example) comprising a second primary winding (which corresponds to the primary winding W21 shown in FIG. 12, for example) and a second secondary winding (which corresponds to the secondary winding W22 shown in FIG. 12, for example) arranged so as to form a set with the second rechargeable battery; and a first switching unit (which corresponds to the switch SW1 shown in FIG. 12, for example) configured to control a state of whether or not a charge voltage of the first rechargeable battery is applied to the first primary winding; and a second switching unit (which corresponds to the switch SW2 shown in FIG. 12, for example) configured to control a state of whether or not a charge voltage of the second rechargeable battery is applied to the second primary winding. Furthermore, the number of turns of the first primary winding differs from that of the first secondary winding. The number of turns of the first primary winding is equal to that of the second primary winding. The number of turns of the first secondary winding is equal to that of the second secondary winding. The first secondary winding and the second secondary winding are connected in parallel, and wherein the first switching unit is configured to perform: a first procedure in which a first terminal of the first rechargeable battery is connected to a first terminal of the first primary winding, and a second terminal of the first rechargeable battery is connected to a second terminal of the first primary winding; and a second procedure in which the first terminal of the first rechargeable battery is connected to the second terminal of the first primary winding, and the second terminal of the first rechargeable battery is connected to the first terminal of the first primary winding, and wherein the second switching unit is configured to perform: a third procedure in which a first terminal of the second rechargeable battery is connected to a first terminal of the second primary winding, and a second terminal of the second rechargeable battery is connected to a second terminal of the second primary winding; and a fourth procedure in which the first terminal of the second rechargeable battery is connected to the second terminal of the second primary winding, and the second terminal of the second rechargeable battery is connected to the first terminal of the second primary winding.

With such an arrangement according to the present invention, the cell balance circuit configured to equalize the respective charge voltages of the first and second rechargeable batteries includes a first transformer, a second transformer, and a first switching unit. Furthermore, the first transformer includes a first primary winding and a second secondary winding, and is arranged so as to form a set with the first rechargeable battery. Moreover, the second transformer includes a second primary winding and a second secondary winding, and is arranged so as to form a set with the second rechargeable battery. The first switching unit is configured to control a state of whether or not the charge voltage of the first rechargeable battery is applied to the first primary winding. Thus, by means of the first switching unit, such an arrangement is capable of applying the charge voltage of the first rechargeable battery to the first primary winding.

When the charge voltage of the first rechargeable battery is applied to the first primary winding, a magnetic flux occurs in the first primary winding, which passes into the first secondary winding. With the magnetic flux as $\Phi_B$, and with the number of turns of the first secondary winding as N, an electromotive forces occurs in the first secondary winding as represented by the aforementioned Expression (1).

With such an arrangement, the magnetic flux that occurs in the first primary winding changes according to a change in the voltage applied to the first primary winding. Thus, the electromotive force that occurs in the first secondary winding changes according to a change in the charge voltage of the first rechargeable battery.

As with the first primary winding described above, when the charge voltage of the second rechargeable battery is applied to the second primary winding, a magnetic flux occurs in the second primary winding, which passes into the second secondary winding. Thus, an electromotive force occurs in the second secondary winding as represented by the aforementioned Expression (1). The electromotive force that occurs in the second secondary winding changes according to a change in the charge voltage of the second rechargeable battery.

With such an arrangement according to the present invention, the first primary winding and the first secondary winding are each configured to have a different number of turns. Furthermore, the first primary winding and the second primary winding are each configured to have an equal number of turns. Moreover, the first secondary winding and the second secondary winding are each configured to have an equal number of turns. Accordingly, the ratio of the number of turns between the first primary winding and the first secondary winding is equal to that between the second primary winding and the second secondary winding. Thus, the winding voltage ratio between the first primary winding and the first secondary winding becomes equal to that between the second primary winding and the second secondary winding. Thus, the ratio between the charge voltage of the first rechargeable battery and the winding voltage of the first secondary winding becomes equal to that between the charge voltage of the second rechargeable battery and the winding voltage of the second secondary winding. As a result, the charge voltage ratio between the first rechargeable battery and the second rechargeable battery becomes equal to the winding voltage ratio between the first secondary winding and the second secondary winding.

With such an arrangement described above, when the charge voltage of the first rechargeable battery is equal to that of the second rechargeable battery, the winding voltage of the first secondary winding becomes equal to that of the second secondary winding. On the other hand, when the charge voltage of the first rechargeable battery is lower than that of the second rechargeable battery, the winding voltage of the first secondary winding becomes lower than that of the second secondary winding. When the charge voltage of the first rechargeable battery is higher than that of the second rechargeable battery, the winding voltage of the first secondary winding becomes higher than that of the second secondary winding.

Furthermore, with such an arrangement according to the present invention, the first secondary winding and the second secondary winding are connected in parallel. Thus, such an arrangement seeks to equalize the winding voltage of the first secondary winding and the winding voltage of the second secondary winding.

Accordingly, when the charge voltage of the first rechargeable battery is equal to that of the second rechargeable battery, the winding voltage of the first secondary winding becomes equal to that of the second secondary winding as described above. In this state, no current flows between the first secondary winding and the second secondary winding. Thus, current flows through neither the first rechargeable battery nor the second rechargeable battery.

On the other hand, when the charge voltage of the first rechargeable battery is lower than that of the second rechargeable battery, the winding voltage of the first secondary winding becomes lower than that of the second secondary winding, as described above. Accordingly, a current flows from the second secondary winding to the first secondary winding until the winding voltage of the first secondary winding becomes equal to that of the second secondary winding, i.e., until the charge voltage of the first rechargeable battery becomes equal to that of the second rechargeable battery. Thus, a current flows from the first primary winding to the first rechargeable battery until the charge voltage of the first rechargeable battery becomes equal to that of the second rechargeable battery, thereby charging the first rechargeable battery. Furthermore, a current flows from the second rechargeable battery to the second primary winding until the charge voltage of the first rechargeable battery becomes equal to that of the second rechargeable battery, thereby discharging the second rechargeable battery.

When the charge voltage of the first rechargeable battery is higher than that of the second rechargeable battery, the winding voltage of the first secondary winding becomes higher than that of the second secondary winding, as described above. Accordingly, a current flows from the first secondary winding to the second secondary winding until the winding voltage of the first secondary winding becomes equal to that of the second secondary winding, i.e., until the charge voltage of the first rechargeable battery becomes equal to that of the second rechargeable battery. Thus, a current flows from the first rechargeable battery to the first primary winding until the charge voltage of the first rechargeable battery becomes equal to that of the second rechargeable battery, thereby discharging the first rechargeable battery. Furthermore, a current flows from the second primary winding to the second rechargeable battery until the charge voltage of the first rechargeable battery becomes equal to that of the second rechargeable battery, thereby discharging the second rechargeable battery.

With such an arrangement described above, the charge voltage of the first rechargeable battery becomes equal to that of the second rechargeable battery. Thus, such an arrangement does not require such a diode required by the circuit disclosed in the aforementioned Patent document 1. This allows the charge voltages of the first rechargeable battery and the second rechargeable battery to be equalized with high precision.

Furthermore, when the first rechargeable battery and the second rechargeable battery are charged or discharged, by means of the first switching unit, the charge voltage of the first rechargeable battery is applied to the first primary winding, and the charge voltage of the second rechargeable battery is applied to the second primary winding. Thus, such an arrangement allows the charge voltages of the first and second rechargeable batteries to be equalized with high precision when the first and second rechargeable batteries are discharged, as well as when the first and second rechargeable batteries are charged, and the cell balance can be stabilized.

Furthermore, such an arrangement is capable of operating the first switching unit without monitoring the charge voltage of the first rechargeable battery or the second rechargeable battery. Thus, there is no need to monitor the charge voltage of the first rechargeable battery or the second rechargeable battery. As a result, such an arrangement provides a cell balance circuit with a low cost and with a compact size.

Furthermore, when the first and second rechargeable batteries are charged or discharged, by respectively applying the charge voltages of the first and second rechargeable batteries to the first and second primary windings, such an arrangement suppresses the occurrence of a difference in the charge voltage between the first rechargeable battery and the second rechargeable battery. Thus, such an arrangement protects the first and second rechargeable batteries from transiently reaching the range of deterioration, thereby suppressing deterioration of the first and second rechargeable batteries.

In a case in which a resistor is connected in parallel to each of the multiple rechargeable batteries as described above, such an arrangement has a problem in that the current that can flow through each rechargeable battery is limited by such a resistor. In contrast, with such an arrangement according to the present invention, the cell balance circuit includes a first transformer and a second transformer instead of such a resistor. The resistance values of the first primary winding and the first secondary winding included in the first transformer, and the resistance values of the second primary winding and the second secondary winding included in the second transformer, are very small as compared with the aforementioned resistor. Thus, the first and second transformers impose only a very small limit on the current that can flow through each rechargeable battery, as compared with the limit imposed by the aforementioned resistors. Thus, such an arrangement employing the first and second transformers has an advantage of an increased current that can flow through the first and second rechargeable batteries, as compared with an arrangement having a configuration in which a resistor is connected in parallel with each of the first and second rechargeable batteries as described above.

With such an arrangement, a rechargeable battery such as the first and second rechargeable batteries is configured to output DC electric power. Thus, such an arrangement has a problem in that the first transformer or the second transformer saturates if the charge voltage of the first rechargeable battery is simply continuously applied to the first primary winding or if the charge voltage of the second rechargeable battery is simply continuously applied to the second primary winding.

In order to solve such a problem, with such an arrangement according to the present invention, the first switching unit is configured to perform the first procedure and the second procedure, and the second switching unit is configured to perform the third procedure and the fourth procedure. In the first procedure, the first terminal of the first rechargeable battery is connected to the first terminal of the first primary winding, and the second terminal of the first rechargeable battery is connected to the second terminal of the first primary winding. In the second procedure, the first terminal of the first rechargeable battery is connected to the second terminal of the first primary winding, and the second terminal of the first rechargeable battery is connected to the first terminal of the first primary winding. In the third procedure, the first terminal of the second rechargeable battery is connected to the first terminal of the second primary winding, and the second terminal of the second rechargeable battery is connected to the second terminal of the second primary winding. In the fourth procedure, the first terminal of the second rechargeable battery is connected to the second terminal of the second primary winding, and the second terminal of the second rechargeable battery is connected to the first terminal of the second primary winding.

With such an arrangement, the voltage polarity inverts at the first terminal of the first primary winding with the second terminal thereof as a reference every time the procedure is switched from the first procedure to the second procedure, and from the second procedure to the first procedure. Furthermore, the voltage polarity inverts at the first terminal of the second primary winding with the second terminal thereof as a reference every time the procedure is switched from the third procedure to the fourth procedure, and from the fourth procedure to the third procedure. Thus, such an arrangement is capable of preventing the first and second transformers from saturating.

(8) Also, the present invention proposes a cell balance circuit configured according to the cell balance circuit described in (7). The cell balance circuit further comprises: a DC power supply (which corresponds to the DC power supply 31 shown in FIG. 14, for example) configured to output a DC voltage; and a third switching unit (which corresponds to the switch SW3 shown in FIG. 14, for example) configured to control a state of whether or not an output voltage of the DC power supply is applied to the first secondary winding.

Such a cell balance circuit according to the present invention configured according to the cell balance circuit described in (7) further includes a DC power supply configured to output a DC voltage, and a third switching unit configured to control a state of whether or not the output voltage of the DC power supply is applied to the first secondary winding. Thus, when the output voltage of the DC power supply is applied to the first secondary winding by means of the third switching unit, such an arrangement seeks to equalize the output voltage of the DC power supply and the winding voltage of the first secondary winding. Furthermore, when the output voltage of the DC power supply is applied to the second secondary winding, such an arrangement seeks to equalize the output voltage of the DC power supply and the winding voltage of the second secondary winding. Thus, such an arrangement seeks to equalize the winding voltage of the first secondary winding and the winding voltage of the second secondary winding, thereby providing the same advantages as those described above.

(9) Also, the present invention proposes a cell balance circuit configured according to the cell balance circuit described in (8). The cell balance circuit further comprises: a fourth switching unit (which corresponds to the switch SW4 shown in FIG. 14, for example) configured to control a state of whether or not an output voltage of the DC power supply is applied to the second secondary winding. The first switching unit and the third switching unit are operated synchronously. Furthermore, the second switching unit and the fourth switching unit are operated synchronously.

The cell balance circuit according to the present invention configured based on the cell balance circuit described in (8) further includes the fourth switching unit configured to control a state of whether or not the output voltage of the DC power supply is applied to the second secondary winding. With such an arrangement, the first switching unit and the third switching unit are synchronously controlled. Furthermore, the second switching unit and the fourth switching unit are synchronously controlled. Thus, such an arrangement provides the same advantages as those described above.

(10) Also, the present invention proposes a cell balance circuit configured according to the cell balance circuit described in (9), wherein the first switching unit with the third switching unit and the second switching unit with the fourth switching unit are operated in an asynchronous manner.

With such an arrangement as described above, the third switching unit controls a state of whether or not the output voltage of the DC power supply is applied to the first secondary winding, and the fourth switching unit controls a state of whether or not the output voltage of the DC power supply is applied to the second secondary winding. Thus, the voltage applied to the wiring that connects the first secondary winding and the DC power supply and the voltage applied to the wiring that connects the second secondary winding and the DC power supply are each configured as a DC voltage. Thus, if the first switching unit and the third switching unit are synchronously controlled, and the second switching unit and the fourth switching unit are synchronously controlled, the first switching unit with the third switching unit, and the second switching unit with the fourth switching unit are allowed to be operated in an asynchronous manner.

In order to solve such a problem, with such an arrangement according to the present invention configured according to the cell balance circuit described in (9), the first switching unit with the third switching unit, the second switching unit with the fourth switching unit are operated in an asynchronous manner. Thus, as there is no need to take into account the equalization of a delay that occurs due to the wiring that transmits a control signal to the first switching unit and the third switching unit with a delay that occurs due to the wiring that transmits a control signal to the second switching unit and the fourth switching unit, such an arrangement allows the wiring to have an increased length. Furthermore, such an arrangement allows to perform the control operation of the switching units in a simple manner. Thus, such an arrangement further facilitates the design of the cell balance circuit.

(11) Also, the present invention proposes a cell balance circuit configured according to the cell balance circuit described in (9) or (10). With such an arrangement, the third switching unit is configured to perform: a fifth procedure in which a higher potential side terminal of the DC power supply is connected to a first terminal of the first secondary winding, and a lower potential side terminal of the DC power supply is connected to a second terminal of the first secondary winding; and a sixth procedure in which the higher potential side terminal of the DC power supply is connected to the second terminal of the first secondary winding, and the lower potential side terminal of the DC power supply is connected to the first terminal of the first secondary winding. Furthermore, the fourth switching unit is configured to perform: a seventh procedure in which the higher potential side terminal of the DC power supply is connected to a first terminal of the second secondary winding, and the lower potential side terminal of the DC power supply is connected to a second terminal of the second secondary winding; and an eighth procedure in which the higher potential side terminal of the DC power supply is connected to the second terminal of the second secondary winding, and the lower potential side terminal of the DC power supply is connected to the first terminal of the second secondary winding.

With such an arrangement according to the present invention configured based on the cell balance circuit described in (9) or (10), the third switching unit is configured to perform the fifth procedure and the sixth procedure, and the fourth switching unit is configured to perform the seventh procedure and the eighth procedure. In the fifth procedure, the higher potential side terminal of the DC power supply is connected to the first terminal of the first secondary winding, and the lower potential side terminal of the DC power supply is connected to the second terminal of the first secondary winding. In the sixth procedure, the higher potential side terminal of the DC power supply is connected to the second terminal of the first secondary winding, and the lower potential side terminal of the DC power supply is connected to the first terminal of the first secondary winding. On the other hand, in the seventh procedure, the higher potential side terminal of the DC power supply is connected to the first terminal of the second secondary winding, and the lower potential side terminal of the DC power supply is connected to the second terminal of the second secondary winding. In the eighth procedure, the higher potential side terminal of the DC power supply is connected to the second terminal of the second secondary winding, and the lower potential side terminal of the DC power supply is connected to the first terminal of the second secondary winding.

With such an arrangement, when the voltage polarity inverts at a first terminal of the first primary winding with the second terminal thereof as a reference, the voltage polarity also inverts at the first terminal of the first secondary winding with the second terminal thereof as a voltage reference terminal. According to the switching of the winding voltage polarity of the first primary winding, the third switching unit is configured to switch the terminal of the first secondary winding to be connected to the higher potential side terminal of the DC power supply to the terminal with the higher potential from among the two terminals (the first terminal and the second terminal) of the first secondary winding. Thus, such an arrangement allows the terminal with the higher potential from among the two terminals (the first terminal and the second terminal) of the first secondary winding to be continuously connected to the higher potential side terminal of the DC power supply. Thus, the voltage applied to the wiring that connects the first secondary winding and the DC power supply is configured as a DC voltage even if an AC voltage is applied to the first primary winding. If an AC voltage is applied to the wiring that connects the first secondary winding and the DC power supply, such an arrangement receives the influence of the inductance component of the wiring. However, with such an arrangement, a DC voltage is applied to the wiring, thereby suppressing the influence of the inductance component of the wiring. Thus, such an arrangement allows the wiring to be lengthened between the first secondary winding and the DC power supply. As with the voltage applied to the wiring that connects the first secondary winding and the DC power supply, the voltage applied to the wiring that connects the second secondary winding and the DC power supply is configured as a DC voltage. Thus, such an arrangement also allows the wiring that connects the second secondary winding and the DC power supply to be lengthened. Thus, such an arrangement facilitates the design of the cell balance circuit.

As described above, the voltage applied to the wiring that connects the first secondary winding and the DC power supply and the voltage applied to the wiring that connects the second secondary winding and the DC power supply are each configured as a DC voltage. By controlling the third switching unit in synchronization with the voltage polarity inversion that occurs at the first primary winding, and by controlling the fourth switching unit in synchronization with the voltage polarity inversion that occurs at the second primary winding, such an arrangement allows the third switching unit and the fourth switching unit to be controlled in an asynchronous manner. Such an arrangement allows the third switching unit and the fourth switching unit to be arranged and controlled in a simple manner. Thus, such an arrangement further facilitates the design of the cell balance circuit.

(12) Also, the present invention proposes a cell balance circuit configured according to the cell balance circuit described in any one of (7) through (11). With such an arrangement, the first transformer and the second transformer are each configured to have mutually separate iron cores.

Here, let us consider a case in which the first rechargeable battery and the second rechargeable battery are not arranged in neighboring positions. In this case, if the iron core of the first transformer and the iron core of the second transformer are monolithically configured, it is difficult to design the cell balance circuit.

In order to solve such a problem, with such an arrangement according to the present invention configured according to the cell balance circuit described in (7) through (11), the first transformer and the second transformer may include different respective iron cores that are mutually separate. Thus, in a case in which the first rechargeable battery and the second rechargeable battery are not arranged in neighboring positions, such an arrangement allows the first transformer to be arranged in the vicinity of the first rechargeable battery, and the second transformer to be arranged in the vicinity of the second rechargeable battery. Thus, such an arrangement facilitates the design of the cell balance circuit.

With such an arrangement according to the present invention configured according to the cell balance circuit described in (7) through (11), the first transformer and the second transformer are each configured to have an iron core. Thus, such an arrangement provides a stable magnetic flux that occurs in the first transformer and the second transformer, as compared with an arrangement in which each transformer includes no iron core. Thus, with such an arrangement, the cell balance can be stabilized with higher precision.

(13) Also, the present invention proposes a cell balance circuit configured according to the cell balance circuit described in any one of (7) through (12). With such an arrangement, the number of turns of the first secondary winding and the number of turns of the second secondary winding are each greater than that of the first primary winding and that of the second primary winding.

With such an arrangement according to the present invention configured according to the cell balance circuit described in any one of (7) through (12), the first secondary winding and the second secondary winding are each configured to have a greater number of turns than that of the first primary winding and that of the second primary winding. Thus, such an arrangement allows the current that flows between the first secondary winding and the DC power supply to be set to a smaller current than the current that flows through the first primary winding. Furthermore, such an arrangement allows the current that flows between the second secondary winding and the DC power supply to be set to a smaller current than the current that flows through the second primary winding. Thus, such an arrangement is capable of reducing the energy loss that occurs at the first secondary winding and the second secondary winding.

(14) Also, the present invention proposes a cell balance circuit configured according to the cell balance circuit described in any one of (7) through (13). With such an arrangement, the first switching unit is configured as a non-resonant converter (see FIGS. 7 through 11, for example).

With such an arrangement according to the present invention configured according to the cell balance circuit described in any one of (7) through (13), the first switching unit is configured as a non-resonant converter. Thus, by appropriately switching the switch elements included in the non-resonant converter, such an arrangement provides the same advantages as those described above.

Effects of Invention

According to the present invention, such an arrangement can be configured with a low cost and with a compact size such that, when a first rechargeable battery and a second rechargeable battery are charged or discharged, the charge voltages of the first and second cells are equalized while suppressing deterioration of the first and second rechargeable batteries.

DETAILED DESCRIPTION OF PREFERRED EMBODIMENTS

Description will be made below regarding embodiments of the present invention with reference to the drawings. It should be noted that each component described in the embodiments may replaced by a known component as appropriate. Also, various kinds of variations may be made including various kinds of combinations including other known components. That is to say, the following embodiments are by no means intended to restrict the content of the invention disclosed in appended claims.

First Embodiment

Configuration of Cell Balance Circuit AA

Figure 1:
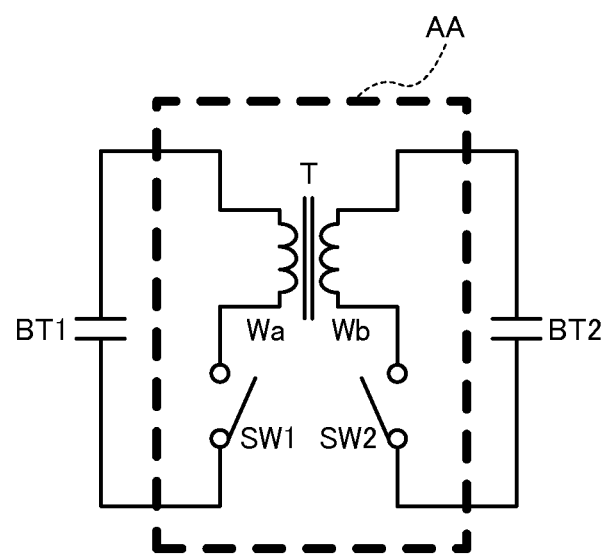
FIG. 1 is a circuit diagram showing a cell balance circuit according to a first embodiment of the present invention.

FIG. 1 is a circuit diagram showing a cell balance circuit AA according to a first embodiment of the present invention. The cell balance circuit AA is configured to equalize the respective charge voltages of rechargeable batteries BT1 and BT2. The rechargeable batteries BT1 and BT2 are each connected to an unshown charger circuit, and are each charged by means of the charger circuit. Furthermore, the rechargeable batteries BT1 and BT2 are each connected to an unshown load such that they supply electric power to the load according to the demands of the load, as a result of which the rechargeable batteries BT1 and BT2 are discharged.

The cell balance circuit AA includes a transformer T, a switch SW1 arranged so as to form a set with the rechargeable battery BT1, and a switch SW2 arranged so as to form a set with the rechargeable battery BT2. The switches SW1 and SW2 are each configured as a MOSFET, IGBT, or BJT. The transformer T includes a primary winding Wa arranged so as to form a set with the rechargeable battery BT1, and a secondary winding Wb arranged so as to form a set with the rechargeable battery BT2. The primary winding Wa and the secondary winding Wb are wound around the same iron core, with the same number of turns.

The primary winding Wa is arranged such that one terminal thereof is connected to one terminal of the rechargeable battery BT1, and the other terminal thereof is connected to the other terminal of the rechargeable battery BT1 via the switch SW1. The secondary winding Wb is arranged such that one terminal thereof is connected to one terminal of the rechargeable battery BT2, and the other terminal thereof is connected to the other terminal of the rechargeable battery BT2 via the switch SW2.

<Operation of Cell Balance Circuit AA>

When there is a difference in the charge voltage between the rechargeable batteries BT1 and BT2 when the rechargeable batteries BT1 and BT2 are charged or discharged, the cell balance circuit AA having the aforementioned configuration provides a current flow to the rechargeable batteries BT1 and BT2 so as to equalize the respective charge voltages of the rechargeable batteries BT1 and BT2. Detailed description will be made below regarding a specific operation of the cell balance circuit AA.

When the rechargeable batteries BT1 and BT2 are charged or discharged, an unshown control circuit is configured to synchronously control the switches SW1 and SW2 of the cell balance circuit AA. When the switches SW1 and SW2 enter the on state, the charge voltage of the rechargeable battery BT1 is applied to the primary winding Wa, and the charge voltage of the rechargeable battery BT2 is applied to the secondary winding Wb.

When the charge voltage of the rechargeable battery BT1 is applied to the primary winding Wa, this generates a magnetic flux in the primary winding Wa. The magnetic flux thus generated passes into the secondary winding Wb. Accordingly, an electromotive force occurs in the secondary winding Wb as represented by Expression (1).

Here, the magnetic flux generated in the primary winding Wa changes according to a change in the voltage applied to the primary winding Wa. Thus, the electromotive force that occurs in the secondary winding Wb also changes according to a change in the charge voltage of the rechargeable battery BT1.

In the same way as the aforementioned primary winding Wa, when the charge voltage of the rechargeable battery BT2 is applied to the secondary winding Wb, this generates a magnetic flux in the secondary winding Wb. The magnetic flux thus generated passes into the primary winding Wa. Accordingly, an electromotive force occurs in the primary winding Wa as represented by Expression (1). With such an arrangement, the electromotive force that occurs in the primary winding Wa changes according to a change in the charge voltage of the rechargeable battery BT2.

When the charge voltage of the rechargeable battery BT1 is equal to that of the rechargeable battery BT2, no current flows through the primary winding Wa as represented by the aforementioned Expression (2). Furthermore, no current flows through the secondary winding Wb as represented by the aforementioned Expression (3). Thus, current flows through neither the first rechargeable battery BT1 nor the second rechargeable battery BT2.

When the charge voltage of the rechargeable battery BT1 is lower than that of the rechargeable battery BT2, a current represented by the aforementioned Expression (2) flows from the primary winding Wa to the rechargeable battery BT1 so as to charge the rechargeable battery BT1 until the charge voltage of the rechargeable battery BT1 becomes equal to that of the rechargeable battery BT2. Furthermore, a current represented by the aforementioned Expression (3) flows from the rechargeable battery BT2 to the secondary winding Wb so as to discharge the rechargeable battery BT2 until the charge voltage of the rechargeable battery BT1 becomes equal to that of the rechargeable battery BT2.

Conversely, when the charge voltage of the rechargeable battery BT1 is higher than that of the rechargeable battery BT2, a current represented by the aforementioned Expression (2) flows from the rechargeable battery BT1 to the primary winding Wa so as to discharge the rechargeable battery BT1 until the charge voltage of the rechargeable battery BT1 becomes equal to that of the rechargeable battery BT2. Furthermore, a current represented by the aforementioned Expression (3) flows from the secondary winding Wb to the rechargeable battery BT2 so as to charge the rechargeable battery BT2 until the charge voltage of the rechargeable battery BT1 becomes equal to that of the rechargeable battery BT2.

With the operation described above, when the rechargeable batteries BT1 and BT2 are charged and discharged, such an arrangement is capable of equalizing the charge voltages of the rechargeable batteries BT1 and BT2.

Such a cell balance circuit AA described above provides the following advantages.

The cell balance circuit AA is capable of equalizing the respective charge voltages of the rechargeable batteries BT1 and BT2 without involving the diodes required by the circuit disclosed in the aforementioned Patent document 1. Furthermore, the cell balance circuit AA is configured to equalize the respective charge voltages of the rechargeable batteries BT1 and BT2 when the rechargeable batteries BT1 and BT2 are charged or discharged. Thus, such an arrangement is capable of accurately equalizing the respective charge voltages of the rechargeable batteries BT1 and BT2 also when the rechargeable batteries are discharged, as well as when the rechargeable batteries are charged, and the cell balance can be stabilized.

Furthermore, the cell balance circuit AA is capable of equalizing the respective charge voltages of the rechargeable batteries BT1 and BT2 without using the respective charge voltages of the rechargeable batteries BT1 and BT2. That is to say, there is no need to monitor the respective charge voltages of the rechargeable batteries BT1 and BT2. Thus, such an arrangement provides a cell balance circuit with a low cost and with a compact size.

Furthermore, the cell balance circuit AA is capable of equalizing the respective charge voltages of the rechargeable batteries BT1 and BT2 when the rechargeable batteries BT1 and BT2 are charged or discharged. Thus, such an arrangement protects the rechargeable batteries BT1 and BT2 from reaching the range of deterioration, thereby suppressing deterioration of the rechargeable batteries BT1 and BT2.

In a case in which a resistor is connected in parallel to each of the multiple rechargeable batteries as described above, such an arrangement has a problem in that the current that can flow through each rechargeable battery is limited by the corresponding resistor. In contrast, the cell balance circuit AA includes a transformer T, and does not include such resistors. The primary winding Wa and the secondary winding Wb, which are components of the transformer T, each have a very small resistance, as compared with the aforementioned resistors. Thus, the transformer T imposes only a very small limit on the current that can flow through each rechargeable battery, as compared with the limit imposed by the aforementioned resistors. Thus, the cell balance circuit AA provides an increased current that can flow through the rechargeable batteries BT1 and BT2, as compared with the aforementioned arrangement in which a resistor is connected in parallel to each of the rechargeable batteries.

Furthermore, the primary winding Wa and the secondary winding Wb are wound around the same iron core. Thus, such an arrangement provides a stable magnetic flux generated in the primary winding Wa and in the secondary winding Wb, as compared with an arrangement in which the primary winding Wa and the secondary winding Wb are not wound around such an iron core, i.e., in a case in which the primary winding Wa and the secondary winding Wa are each configured as an air-core coil. Thus, the cell balance can be stabilized with higher precision.

Second Embodiment

Configuration of Cell Balance Circuit BB

Figure 4:
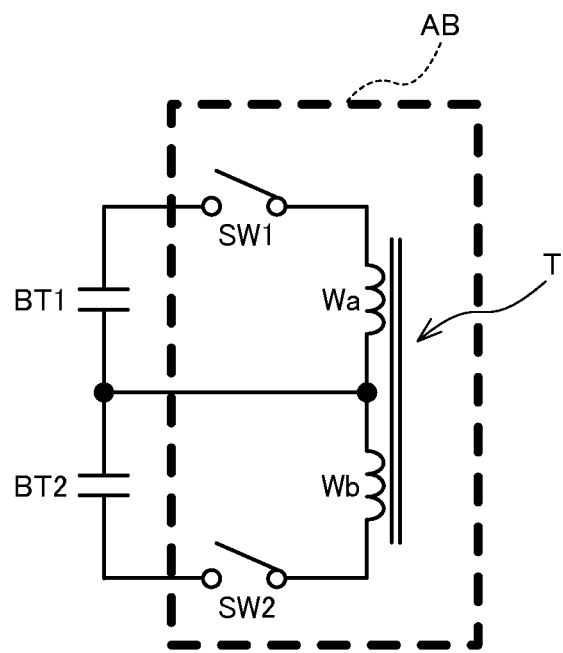
FIG. 4 is an equivalent circuit diagram showing the cell balance circuit according to the first embodiment of the present invention.
Figure 5:
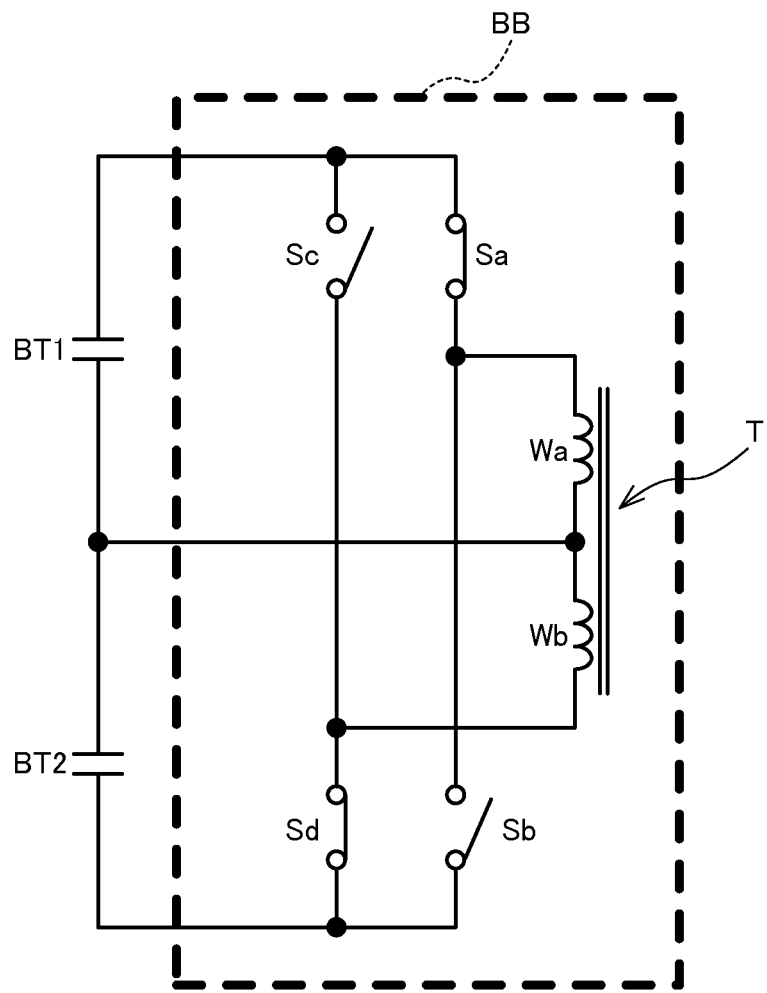
FIG. 5 is a circuit diagram showing a cell balance circuit according to a second embodiment of the present invention.

FIG. 5 is a circuit diagram showing a cell balance circuit BB according to a second embodiment of the present invention. The cell balance circuit BB is configured as a modification of the cell balance circuit AA shown in FIG. 1 according to the first embodiment of the present invention. Description will be made with reference to FIGS. 2 through 4 regarding the relation between the cell balance circuit AA and the cell balance circuit BB.

Figure 2:
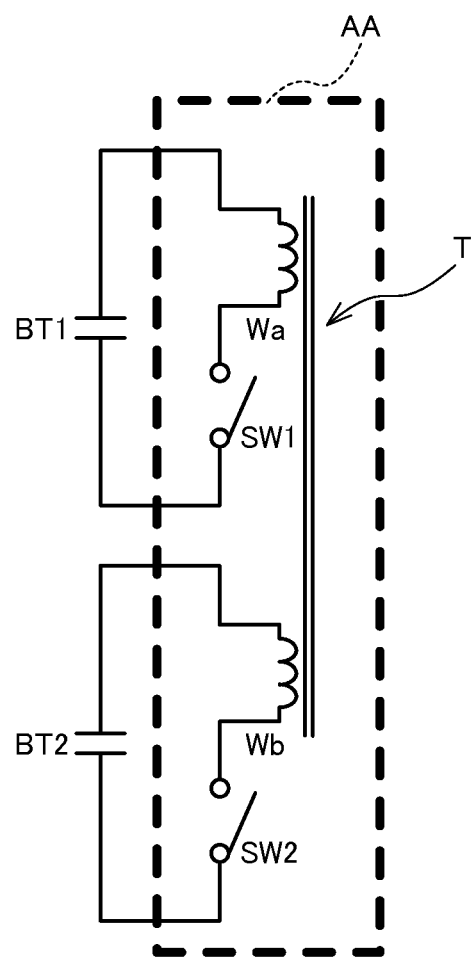
FIG. 2 is an equivalent circuit diagram showing the cell balance circuit according to the first embodiment of the present invention.

The cell balance circuit AA shown in FIG. 1 can also be represented as a circuit shown in FIG. 2.

Figure 3:
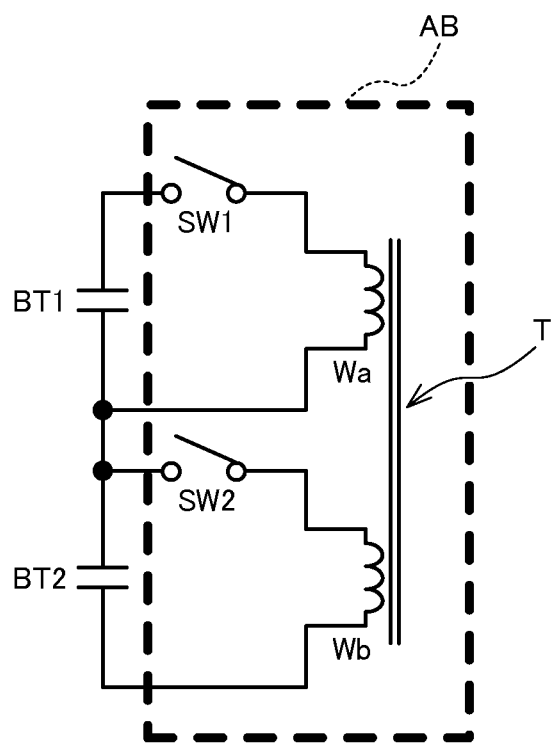
FIG. 3 is an equivalent circuit diagram showing the cell balance circuit according to the first embodiment of the present invention.

FIG. 3 is a circuit diagram showing a cell balance circuit AB. The cell balance circuit AB is an equivalent circuit of the cell balance circuit AA shown in FIG. 2. The cell balance circuit AB has the same circuit configuration as that of the cell balance circuit AA except that, in the cell balance circuit AB, the rechargeable batteries BT1 and BT2 are connected in series. In the description of the cell balance circuit AB, the same components as those of the cell balance circuit AA are denoted by the same reference symbols, and description thereof will be omitted.

The cell balance circuit AB shown in FIG. 3 can be represented as a circuit shown in FIG. 4.

With the cell balance circuit AB shown in FIG. 4, by controlling the switches SW1 and SW2, such an arrangement provides the same advantages as those of the cell balance circuit AA. However, the rechargeable batteries BT1 and BT2 each output DC electric power. With the cell balance circuit AA or the cell balance circuit AB described above with reference to FIGS. 1 through 4, if the switches SW1 and SW2 are fixed to the on state, this leads to saturation of the transformer T. In order to prevent the saturation of the transformer T, the cell balance circuit BB shown in FIG. 5 is configured according to the second embodiment of the present invention.

The cell balance circuit BB has the same configuration as that of the cell balance circuit AB shown in FIG. 4 except that the cell balance circuit BB includes switches Sa, Sb, Sc, and Sd, instead of the switches SW1 and SW2. The switches Sa, Sb, Sc, and Sd are each configured as a MOSFET, IGBT, or BJT, for example. In the description of the cell balance circuit BB, the same components as those of the cell balance circuit AB shown in FIG. 4 are denoted by the same reference symbols, and description thereof will be omitted.

The other terminal of the primary winding Wa and one terminal of the secondary winding Wb are each connected to the other terminal of the rechargeable battery BT1 and one terminal of the rechargeable battery BT2 are connected. Furthermore, one terminal of the primary winding Wa is connected to one terminal of the rechargeable battery BT1 via the switch Sa, and is connected to the rechargeable battery BT2 via the switch Sb. Moreover, the other terminal of the secondary winding Wb is connected to the aforementioned one terminal of the rechargeable battery BT1 via the switch Sc, and is connected to the other terminal of the rechargeable battery BT2 via the switch Sd.

<Operation of Cell Balance Circuit BB>

When the rechargeable batteries BT1 and BT2 are charged or discharged, when there is a difference in the charge voltage between the rechargeable batteries BT1 and BT2, the cell balance circuit BB is configured to provide a current flow to the rechargeable batteries BT1 and BT2 so as to equalize the respective charge voltages of the rechargeable batteries BT1 and BT2. Detailed description will be made below regarding a specific operation of the cell balance circuit BB.

When the rechargeable batteries BT1 and BT2 are charged or discharged, the cell balance circuit BB is configured to alternately switch on and off switches Sa and Sd and switches Sb and Sc with a duty ratio of 50% by means of an unshown control unit.

When the switches Sa and Sd are turned on, and the switches Sb and Sc are turned off, the charge voltage of the rechargeable battery BT1 is applied to the primary winding Wa, and the charge voltage of the rechargeable battery BT2 is applied to the secondary winding Wb. On the other hand, when the switches Sa and Sd are turned off, and the switches Sb and Sc are turned on, the charge voltage of the rechargeable battery BT2 is applied to the primary winding Wa, and the charge voltage of the rechargeable battery BT1 is applied to the secondary winding Wb. It should be noted that the voltage polarity inverts at one terminal of the primary winding Wa with the other terminal thereof as a reference and at one terminal of the secondary winding Wb with the other terminal thereof as a reference, every time the connection state is switched between the state in which the switches Sa and Sd are turned on and the switches Sb and Sc are turned off and the state in which the switches Sa and Sd are turned off and the switches Sb and Sc are turned on.

The cell balance circuit BB described above provides the following advantages in addition to the aforementioned advantages provided by the cell balance circuit AA shown in FIG. 1 according to the first embodiment of the present invention.

With such an arrangement, the connection state is alternately switched with a duty ratio of 50% between the state in which the switches Sa and Sd are turned on and the switches Sb and Sc are turned off and the state in which the switches Sa and Sd are turned off and the switches Sb and Sc are turned on. Accordingly, the voltage polarity inverts at one terminal of the primary winding Wa with the other terminal thereof as a reference and at one terminal of the secondary winding Wb with the other terminal thereof as a reference every time the connection state is switched between the state in which the switches Sa and Sd are turned on and the switches Sb and Sc are turned off and the state in which the switches Sa and Sd are turned off and the switches Sb and Sc are turned on. Such an arrangement is capable of preventing the transformer T from saturating.

Furthermore, the switches Sa, Sb, Sc, and Sd are each switched on and off with a duty ratio of 50%. Thus, such an arrangement allows the cell balance circuit AA to equalize the respective charge voltages of the rechargeable batteries BT1 and BT2 with higher precision.

Third Embodiment

Configuration of Cell Balance Apparatus 1

Figure 6:
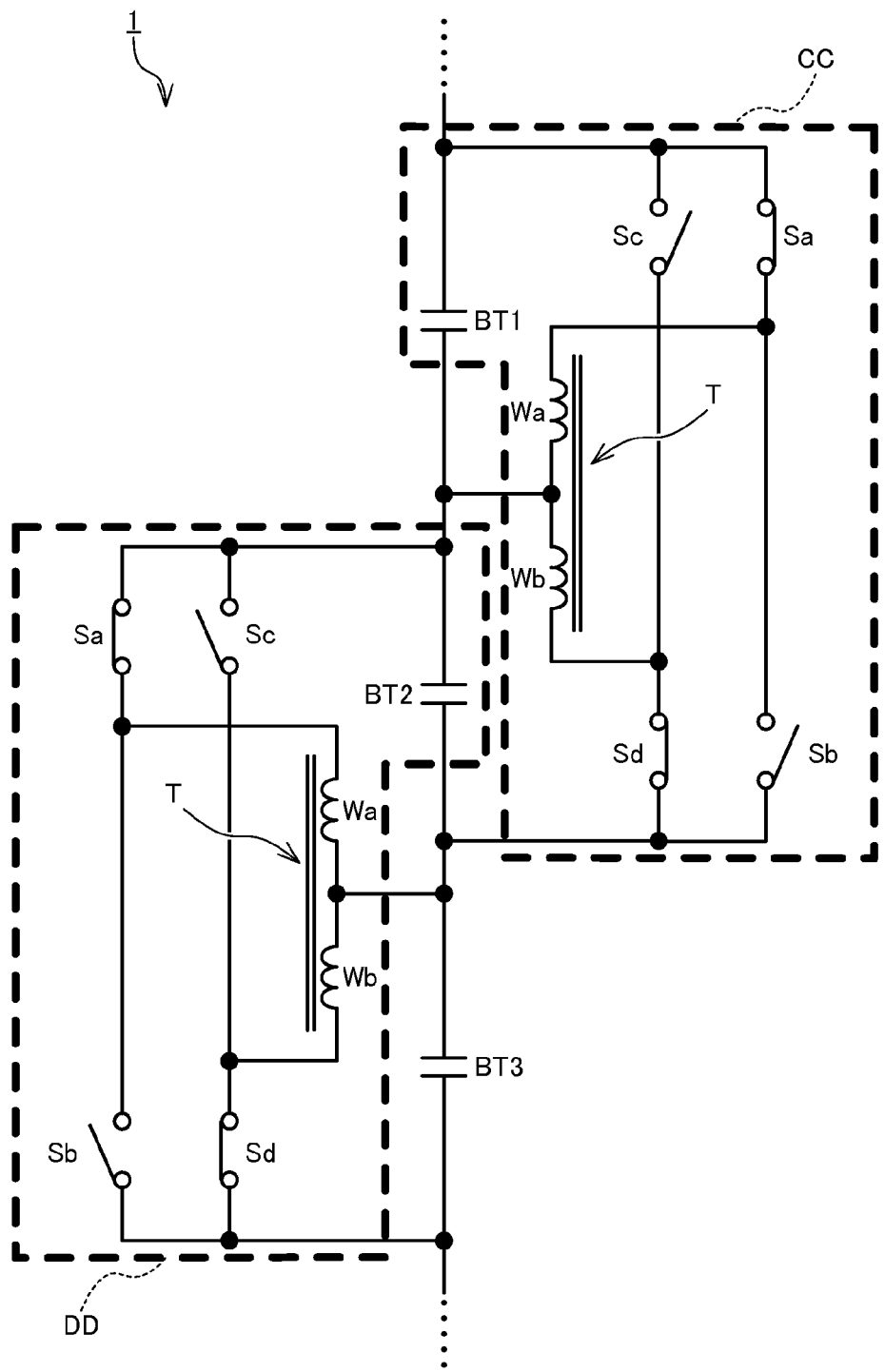
FIG. 6 is a circuit diagram showing a cell balance circuit according to a third embodiment of the present invention.

FIG. 6 is a circuit diagram showing a cell balance apparatus 1 including cell balance circuits CC and DD according to a third embodiment of the present invention. The cell balance apparatus 1 is configured to equalize the respective charge voltages of the rechargeable batteries BT1 through BT3 connected in series. The rechargeable batteries BT1 through BT3 are connected to an unshown charger circuit, and are each charged by means of the charger circuit thus connected. Furthermore, the rechargeable batteries BT1 through BT3 are connected to an unshown load such that they supply electric power to the load according to the demands of the load, as a result of which the rechargeable batteries BT1 through BT3 are discharged.

The cell balance apparatus 1 includes a cell balance circuit CC configured to equalize the respective charge voltages of the rechargeable batteries BT1 and BT2, and a cell balance circuit DD configured to equalize the respective charge voltages of the rechargeable batteries BT2 and BT3. The cell balance circuits CC and DD each have the same configuration as that of the cell balance circuit BB shown in FIG. 5 according to the second embodiment of the present invention except that the cell balance circuit CC is monolithically configured with the rechargeable battery BT1, and the cell balance circuit DD is monolithically configured with the rechargeable battery BT2. It should be noted that, in the description of the cell balance circuits CC and DD, the same components as those of the cell balance circuit BB are denoted by the same reference symbols, and description thereof will be omitted.

<Operation of Cell Balance Apparatus 1>

When the rechargeable batteries BT1 through BT3 are charged or discharged, the cell balance apparatus 1 having the aforementioned configuration is configured to instruct the cell balance circuits CC and DD to perform the same operation as that of the cell balance circuit BB, thereby equalizing the charge voltages of the rechargeable batteries BT1 through BT3.

With the cell balance circuits CC and DD described above, such an arrangement provides the following advantages in addition to the aforementioned advantages provided by the cell balance circuit BB shown in FIG. 5 according to the second embodiment of the present invention.

With such an arrangement, the cell balance circuit CC is monolithically configured with the rechargeable battery BT1, and the cell balance circuit DD is monolithically configured with the rechargeable battery BT2. Such an arrangement provides a compact-size cell balance apparatus as compared with an arrangement in which the cell balance circuits CC and DD are each configured as a unit separate from the rechargeable battery.

Furthermore, the cell balance apparatus 1 described above provides the following advantages.

When the rechargeable batteries BT1 through BT3 are charged or discharged, the respective charge voltages of the rechargeable batteries BT1 and BT2 are equalized by the cell balance circuit CC, and the respective charge voltages of the rechargeable batteries BT2 and BT3 are equalized by the cell balance circuit DD. Thus, the cell balance apparatus 1 is capable of equalizing the respective charge voltages of the rechargeable batteries BT1 through BT3 when the rechargeable batteries BT1 through BT3 are discharged, as well as when the rechargeable batteries BT1 through BT3 are charged, and the cell balance can be stabilized.

Furthermore, such an arrangement allows the cell balance circuits CC and DD to perform the switching of the switches Sa, Sb, Sc, and Sd in an asynchronous manner. That is to say, there is no need to synchronize the switching of the switches Sa, Sb, Sc, and Sd between the cell balance circuits CC and DD. Such an arrangement allows the switching control operation to be performed in a simple manner. Furthermore, such an arrangement facilitates the design of the cell balance apparatus 1.

Fourth Embodiment

Configuration of Cell Balance Circuit EE

Figure 7:
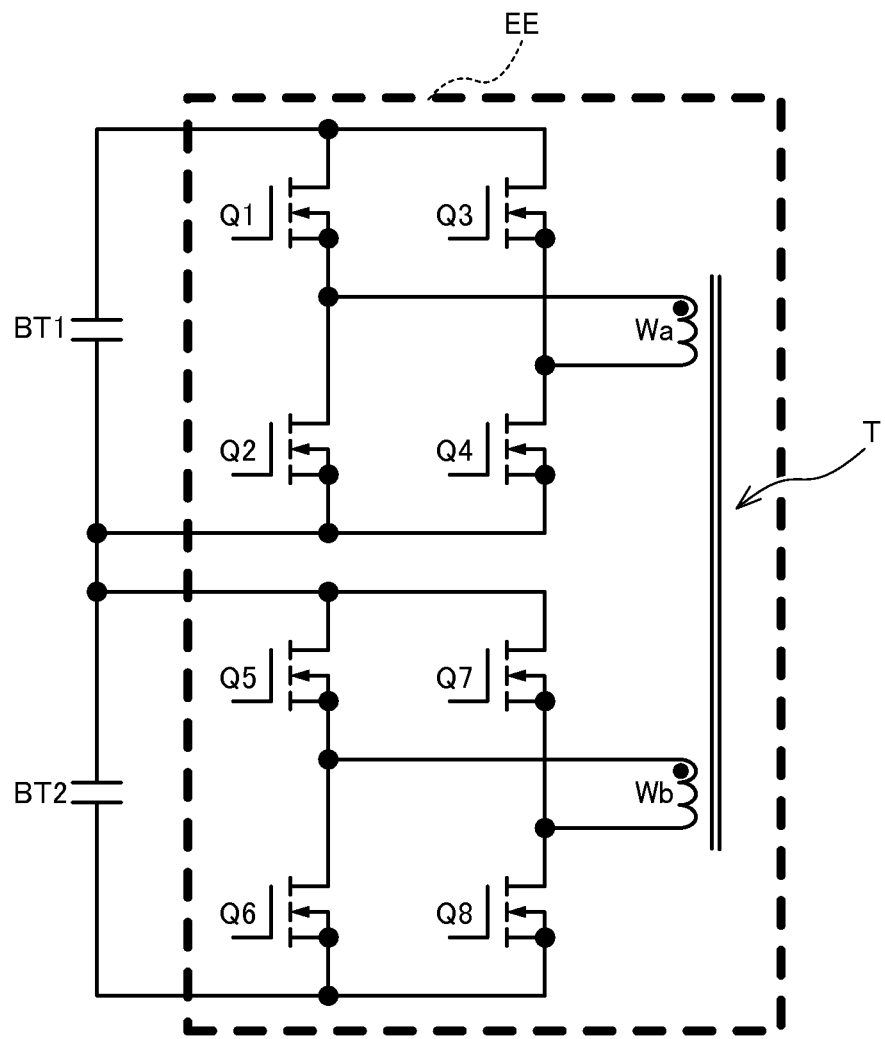
FIG. 7 is a circuit diagram showing a cell balance circuit according to a fourth embodiment of the present invention.

FIG. 7 is a circuit diagram showing a cell balance circuit EE according to a fourth embodiment of the present invention. The cell balance circuit EE has the same configuration as that of the cell balance circuit BB shown in FIG. 5 according to the second embodiment of the present invention except that the cell balance circuit EE includes switch elements Q1 through Q8 each configured as an N-channel MOSFET, instead of the switches Sa, Sb, Sc, and Sd. It should be noted that, in the description of the cell balance circuit EE, the same components as those of the cell balance circuit BB are denoted by the same reference symbols, and description thereof will be omitted.

The switch elements Q1 through Q4 are configured as a set with the rechargeable battery BT1, so as to form a so-called full-bridge circuit. Specifically, one terminal of the rechargeable battery BT1 is connected to the drain of the switch element Q1 and the drain of the switch element Q3. Furthermore, the source of the switch element Q1 is connected to the drain of the switch element Q2 and one terminal of the primary winding Wa. The source of the switch element Q3 is connected to the drain of the switch element Q4 and the other terminal of the primary winding Wa. The other terminal of the rechargeable battery BT1 is connected to the source of the switch element Q2 and the source of the switch element Q4.

In the same way as the aforementioned switch elements Q1 through Q4, the switch elements Q5 through Q8 are configured as a set with the rechargeable battery BT2, so as to form a so-called full-bridge circuit.

<Operation of Cell Balance Circuit EE>

When the rechargeable batteries BT1 and BT2 are charged or discharged, when there is a difference in the charge voltage between the rechargeable batteries BT1 and BT2, the cell balance circuit EE is configured to supply a current flow to the rechargeable batteries BT1 and BT2, so as to equalize the respective charge voltages of the rechargeable batteries BT1 and BT2. Detailed description will be made below regarding a specific operation of the cell balance circuit EE.

When the rechargeable batteries BT1 and BT2 are charged or discharged, the cell balance circuit EE instructs an unshown control unit to alternately switch on and off the switch elements Q1, Q4, Q5, Q8, and the switch elements Q2, Q3, Q6, Q7, with a duty ratio of 50%. With such an arrangement, the charge voltage of the rechargeable battery BT1 is applied to the primary winding Wa, and the charge voltage of the rechargeable battery BT2 is applied to the secondary winding Wb. Furthermore, in the same way as with the cell balance circuit BB, the voltage polarity inverts at one terminal of the primary winding Wa with the other terminal thereof as a reference and at one terminal of the secondary winding Wb with the other terminal thereof as a reference according to the switching of the switch elements Q1 through Q8.

With the cell balance circuit EE described above, such an arrangement provides the same advantages as those provided by the cell balance circuit BB shown in FIG. 5 according to the second embodiment of the present invention.

Fifth Embodiment

Configuration of Cell Balance Circuit FF

Figure 8:
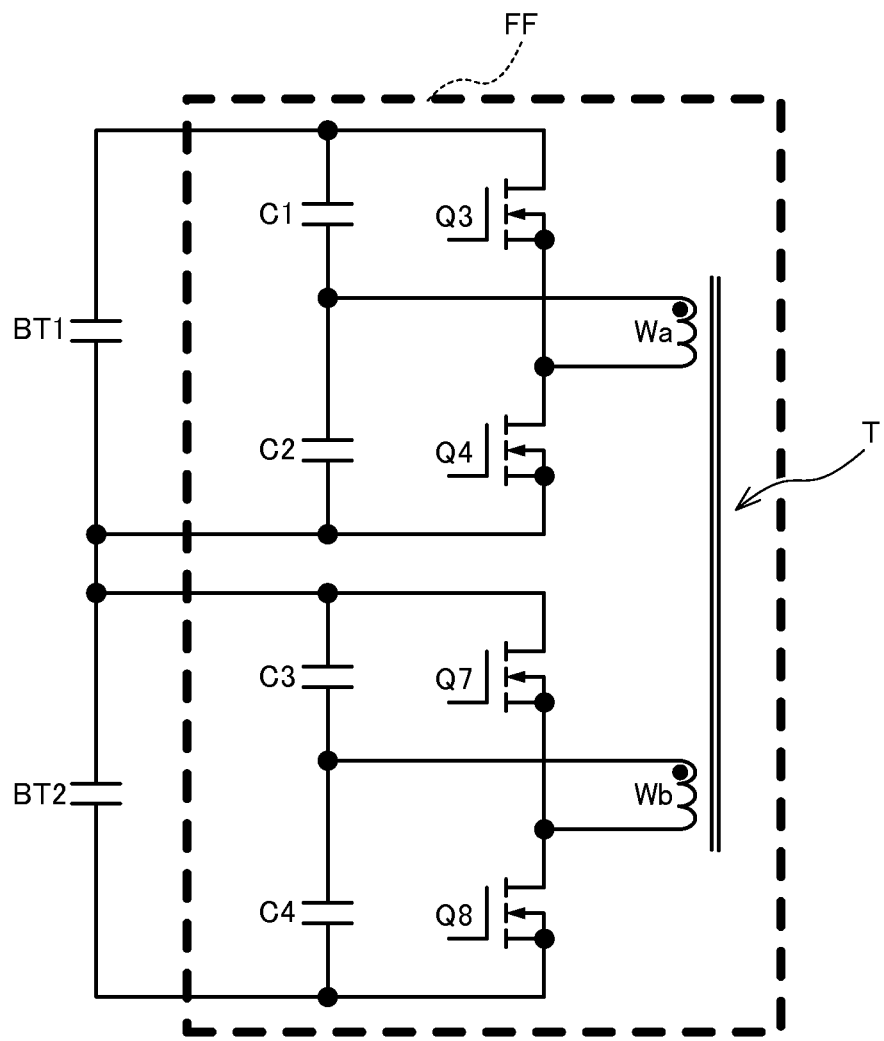
FIG. 8 is a circuit diagram showing a cell balance circuit according to a fifth embodiment of the present invention.

FIG. 8 is a circuit diagram showing a cell balance circuit FF according to a fifth embodiment of the present invention. The cell balance circuit FF has the same configuration as that of the cell balance circuit EE shown in FIG. 7 according to the fourth embodiment of the present invention except that the cell balance circuit FF includes capacitors C1 through C4 instead of the switch elements Q1, Q2, Q5, and Q6. It should be noted that, in the description of the cell balance circuit FF, the same components as those of the cell balance circuit EE are denoted by the same reference symbols, and description thereof will be omitted.

The switch elements Q3 and Q4 and the capacitors C1 and C2 are arranged as a set with the rechargeable battery BT1, so as to form a so-called half-bridge circuit. Specifically, one electrode terminal of the capacitor C1 is connected to one terminal of the rechargeable battery BT1, and the other electrode terminal of the capacitor C1 is connected to one electrode terminal of the capacitor C2 and one terminal of the primary winding Wa. The other electrode terminal of the capacitor C2 is connected to the other terminal of the rechargeable battery BT1.

Also, the switch elements Q7 and Q8 and the capacitors C3 and C4 are arranged as a set with the rechargeable battery BT2 so as to form a so-called half-bridge circuit, in the same way as the switch elements Q3 and Q4 and the capacitors C1 and C2 arranged as described above.

[Operation of Cell Balance Circuit FF]

In the same way as with the cell balance circuit EE, when the rechargeable batteries BT1 and BT2 are charged or discharged, when there is a difference in the charge voltage between the rechargeable batteries BT1 and BT2, the cell balance circuit FF is configured to supply a current flow to the rechargeable batteries BT1 and BT2 so as to equalize the respective charge voltages of the rechargeable batteries BT1 and BT2.

With the cell balance circuit FF described above, such an arrangement provides the same advantages as those provided by the cell balance circuit EE shown in FIG. 7 according to the fourth embodiment of the present invention.

Sixth Embodiment

Configuration of Cell Balance Circuit GG

Figure 9:
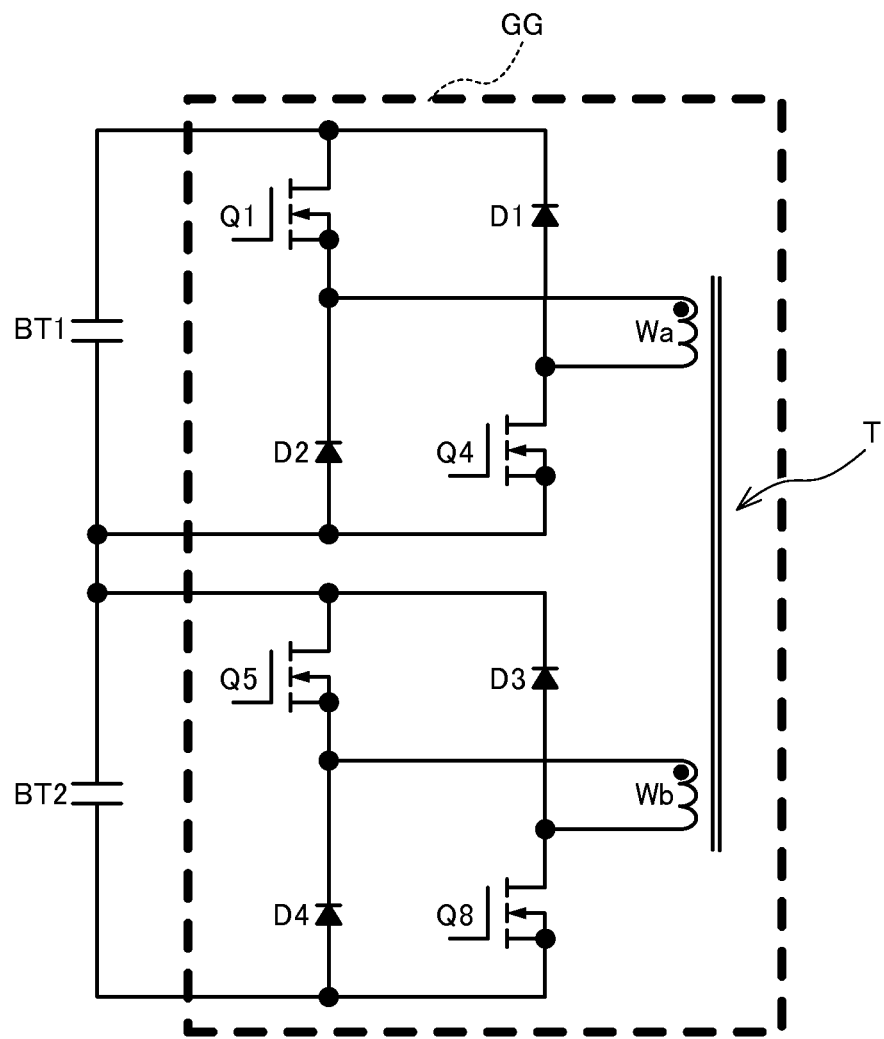
FIG. 9 is a circuit diagram showing a cell balance circuit according to a sixth embodiment of the present invention.

FIG. 9 is a circuit diagram showing a cell balance circuit GG according to a sixth embodiment of the present invention. The cell balance circuit GG has the same configuration as that of the cell balance circuit EE shown in FIG. 7 according to the fourth embodiment of the present invention, except that the cell balance circuit GG includes diodes D1 through D4 instead of the switch elements Q2, Q3, Q6, and Q7. It should be noted that, in the description of the cell balance circuit GG, the same components as those of the cell balance circuit EE are denoted by the same reference symbols, and description thereof will be omitted.

The switch elements Q1 and Q4 and the diodes D1 and D2 are configured so as to form a set with the rechargeable battery BT1, so as to form a so-called forward circuit. Specifically, the cathode of the diode D1 is connected to one terminal of the rechargeable battery BT1, and the anode of the diode D1 is connected to the drain of the switch element Q4 and the other terminal of the primary winding Wa. Furthermore, the cathode of the diode D2 is connected to the source of the switch element Q1 and one terminal of the primary winding Wa, and the anode of the diode D2 is connected to the other terminal of the rechargeable battery BT1.

In the same way as with the aforementioned switch elements Q1 and Q4 and the diode D1 and D2, the switch elements Q5 and Q8 and the diodes D3 and D4 are configured so as to form a set with the rechargeable battery BT2, so as to form a so-called forward circuit.

[Operation of Cell Balance Circuit GG]

In the same way as with the cell balance circuit EE, when the rechargeable batteries BT1 and BT2 are charged or discharged, when there is a difference in the charge voltage between the rechargeable batteries BT1 and BT2, the cell balance circuit GG is configured to supply a current flow to the rechargeable batteries BT1 and BT2, so as to equalize the respective charge voltages of the rechargeable batteries BT1 and BT2.

With the cell balance circuit GG described above, such an arrangement provides the same advantages as those provided by the cell balance circuit EE shown in FIG. 7 according to the fourth embodiment of the present invention.

Seventh Embodiment

Configuration of Cell Balance Circuit HH

Figure 10:
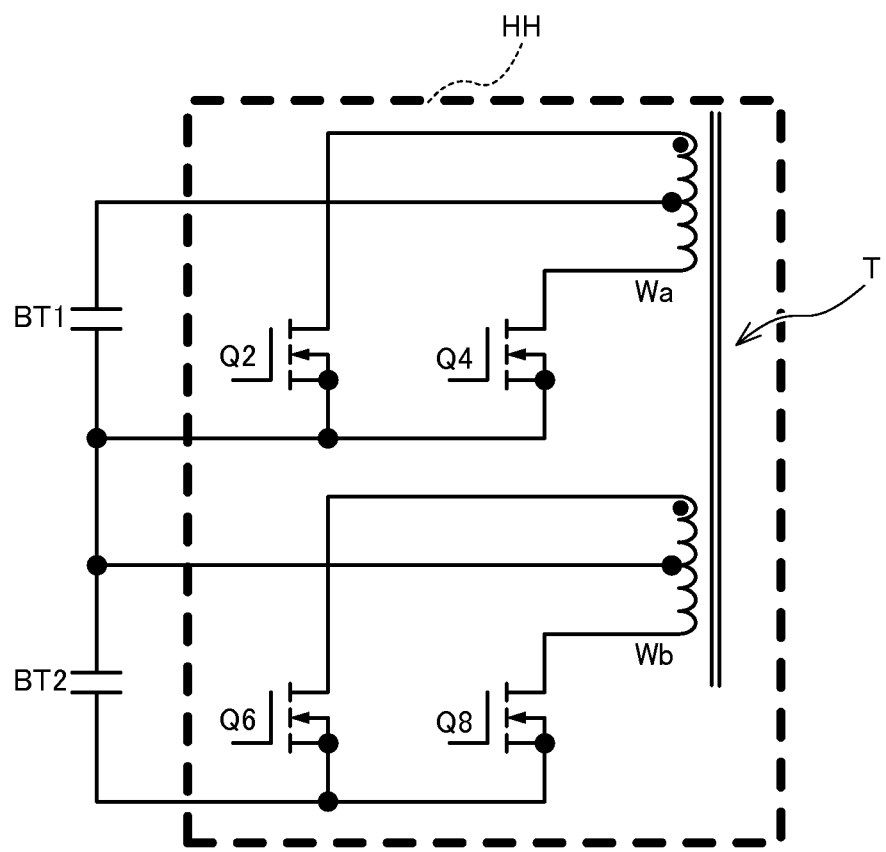
FIG. 10 is a circuit diagram showing a cell balance circuit according to a seventh embodiment of the present invention.

FIG. 10 is a circuit diagram showing a cell balance circuit HH according to a seventh embodiment of the present invention. The cell balance circuit HH has the same configuration as that of the cell balance circuit EE shown in FIG. 7 according to the fourth embodiment of the present invention except that the cell balance circuit HH does not include the switch elements Q1, Q3, Q5, and Q7, and an intermediate node is provided to each of the primary winding Wa and the secondary winding Wb. It should be noted that, in the description of the cell balance circuit HH, the same components as those of the cell balance circuit EE are denoted by the same reference symbols, and description thereof will be omitted.

The switch elements Q2 and Q4 are configured so as to form a set with the rechargeable battery BT1, so as to form a so-called push-pull circuit. Specifically, the drain of the switch element Q2 is connected to one terminal of the primary winding Wa, and the drain of the switch element Q4 is connected to the other terminal of the primary winding Wa. The source of the switch element Q2 and the source of the switch element Q4 are each connected to the other terminal of the rechargeable battery BT1. Furthermore, one terminal of the rechargeable battery BT1 is connected to the intermediate node of the primary winding Wa.

In the same way as with the aforementioned switch elements Q2 and Q4, the switch elements Q6 and Q8 are configured so as to form a set with the rechargeable battery BT2, so as to form a so-called push-pull circuit.

<Operation of Cell Balance Circuit HH>

In the same way as with the cell balance circuit EE, when the rechargeable batteries BT1 and BT2 are charged or discharged, when there is a difference in charge voltage between the rechargeable batteries BT1 and BT2, the cell balance circuit HH is configured to provide a current flow to the rechargeable batteries BT1 and BT2, so as to equalize the charge voltages of the rechargeable batteries BT1 and BT2.

With the cell balance circuit HH described above, such an arrangement provides the same advantages as those provided by the cell balance circuit EE shown in FIG. 7 according to the fourth embodiment of the present invention.

Eighth Embodiment

Configuration of Cell Balance Circuit JJ

Figure 11:
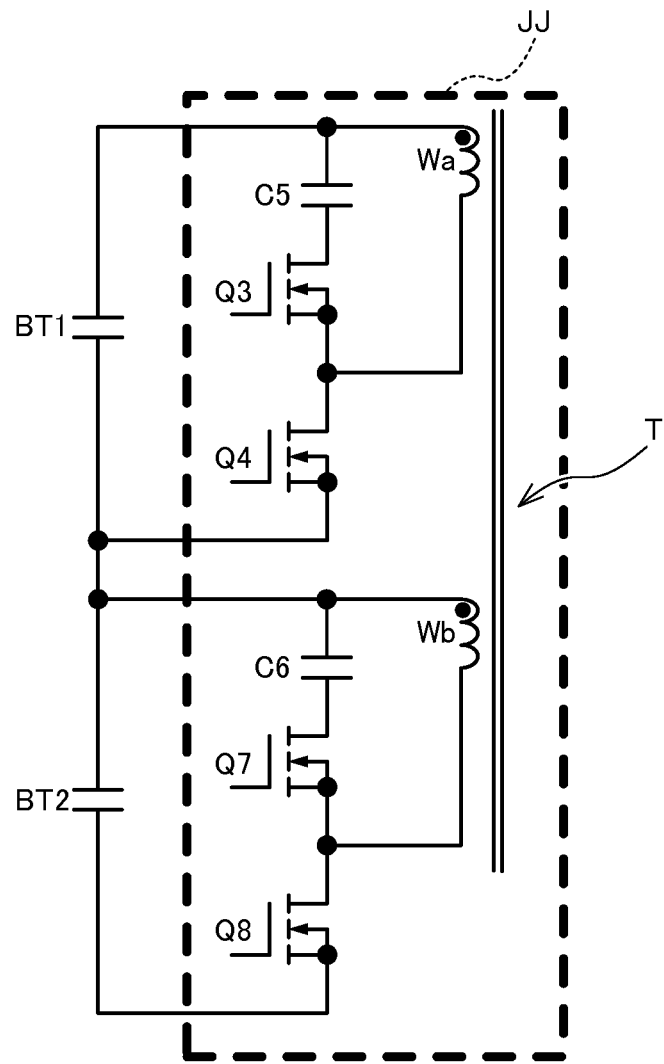
FIG. 11 is a circuit diagram showing a cell balance circuit according to an eighth embodiment of the present invention.

FIG. 11 is a circuit diagram showing a cell balance circuit JJ according to an eighth embodiment of the present invention. The cell balance circuit JJ has the same configuration as that of the cell balance circuit EE shown in FIG. 7 according to the fourth embodiment of the present invention except that the cell balance circuit JJ includes capacitors C5 and C6 instead of the switch elements Q1, Q2, Q5, and Q6. It should be noted that, in the description of the cell balance circuit JJ, the same components as those of the cell balance circuit EE are denoted by the same reference symbols, and description thereof will be omitted.

The switch elements Q3 and Q4 and the capacitor C5 are configured so as to form a set with the rechargeable battery BT1, so as to form a so-called active clamp forward circuit. Specifically, the drain of the switch element Q3 is connected to one terminal of the rechargeable battery BT1 and one terminal of the primary winding Wa via the capacitor C5. Furthermore, the source of the switch element Q3 is connected to the drain of the switch element Q4 and the other terminal of the primary winding Wa.

In the same way as with the aforementioned switch elements Q3 and Q4 and capacitor C5, the switch elements Q7 and Q8 and the capacitor C6 are configured so as to form a set with the rechargeable battery BT2, so as to form a so-called active clamp forward circuit.

<Operation of Cell Balance Circuit JJ>

In the same way as with the cell balance circuit EE, when the rechargeable batteries BT1 and BT2 are charged or discharged, when there is a difference in the charge voltage between the rechargeable batteries BT1 and BT2, the cell balance circuit JJ is configured to supply a current flow to the rechargeable batteries BT1 and BT2, so as to equalize the respective charge voltages of the rechargeable batteries BT1 and BT2.

With the cell balance circuit JJ described above, such an arrangement provides the same advantages as those provided by the cell balance circuit EE shown in FIG. 7 according to the fourth embodiment of the present invention.

Ninth Embodiment

Configuration of Cell Balance Circuit KK

Figure 12:
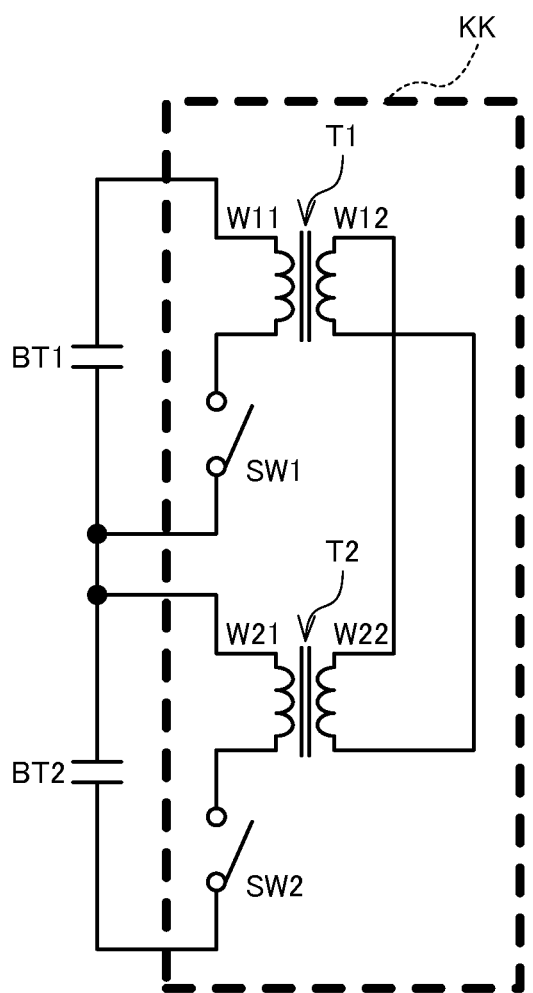
FIG. 12 is a circuit diagram showing a cell balance circuit according to a ninth embodiment of the present invention.

FIG. 12 is a circuit diagram showing a cell balance circuit KK according to a ninth embodiment of the present invention. The cell balance circuit KK has the same configuration as that of the cell balance circuit AB shown in FIG. 3 except that the cell balance circuit KK includes transformers T1 and T2 instead of the single transformer T1. It should be noted that, in the description of the cell balance circuit KK, the same components as those of the cell balance circuit AB are denoted by the same reference symbols, and description thereof will be omitted.

The transformer T1 includes a primary winding W11 and a secondary winding W12 configured so as to form a set with the rechargeable battery BT1. The transformer T2 includes a primary winding W21 and a secondary winding W22 configured so as to form a set with the rechargeable battery BT2.

The number of turns of the primary winding W11 is equal to that of the primary winding W21. Furthermore, the number of turns of the secondary winding W12 is equal to that of the secondary winding W22. Moreover, the number of turns of each of the secondary windings W12 and W22 is greater than that of each of the primary windings W11 and W21.

The transformers T1 and T2 each include an iron core. The iron core of the transformer T1 and the iron core of the transformer T2 are configured separately.

One terminal of the primary winding W11 is connected to one terminal of the rechargeable battery BT1, and the other terminal of the primary winding W11 is connected to the other terminal of the rechargeable battery BT1 via the switch SW1. One terminal of the primary winding W21 is connected to one terminal of the rechargeable battery BT2, and the other terminal of the primary winding W21 is connected to the other terminal of the rechargeable battery BT2 via the switch SW2.

The secondary winding W12 and the secondary winding W22 are connected in parallel.

<Operation of Cell Balance Circuit KK>

In the same way as with the cell balance circuit AB, when the rechargeable batteries BT1 and BT2 are charged or discharged, when there is a difference in the charge voltage between the rechargeable batteries BT1 and BT2, the cell balance circuit KK is configured to supply a current flow to the rechargeable batteries BT1 and BT2, so as to equalize the respective charge voltages of the rechargeable batteries BT1 and BT2. Detailed description will be made below regarding a specific operation of the cell balance circuit KK.

When the rechargeable batteries BT1 and BT2 are charged or discharged, the cell balance circuit KK is configured to instruct an unshown control unit to synchronously control the switches SW1 and SW2. When the switches SW1 and SW2 enter the on state, the charge voltage of the rechargeable battery BT1 is applied to the primary winding W11, and the charge voltage of the rechargeable battery BT2 is applied to the primary winding W21.

When the charge voltage of the rechargeable battery BT1 is applied to the primary winding W11, a magnetic flux occurs in the primary winding W11, which passes into the secondary winding W12. Thus, an electromotive force occurs in the secondary winding W12 as represented by the aforementioned Expression (1). It should be noted that, in the relation between the primary winding W11 and the secondary winding W12 represented by the aforementioned Expression (1), "$\Phi_B$" represents the magnetic flux that occurs in the primary winding W11 and passes into the secondary winding W12, "N" represents the number of turns of the secondary winding W2, and "$\epsilon$" represents the electromotive force that occurs in the secondary winding W12.

Here, the magnetic flux that occurs in the primary winding W11 changes according to a change in the voltage applied to the primary winding W11. Thus, the electromotive force that occurs in the secondary winding W12 changes according to the charge voltage of the rechargeable battery BT1.

In the same way as with the aforementioned primary winding W11, when the charge voltage of the rechargeable battery BT2 is applied to the primary winding W21, a magnetic flux occurs in the primary winding W21, which passes into the secondary winding W22. Thus, an electromotive force occurs in the secondary winding W22 as represented by the aforementioned Expression (1). With such an arrangement, the electromotive force that occurs in the secondary winding W22 changes according to a change in the charge voltage of the rechargeable battery BT2.

Here, as described above, the number of turns of the primary winding W11 is equal to that of the primary winding W21. Furthermore, the number of turns of the secondary winding W12 is equal to that of the secondary winding W22. Accordingly, the ratio between the winding voltage of the primary winding W11 and the winding voltage of the secondary winding W12 becomes equal to the ratio between the winding voltage of the primary winding W21 and the winding voltage of the secondary winding W22. Thus, the ratio between the charge voltage of the rechargeable battery BT1 and the winding voltage of the secondary winding W12 becomes equal to the ratio between the charge voltage of the rechargeable battery BT2 and the winding voltage of the secondary winding W22. Thus, the ratio between the charge voltage of the rechargeable battery BT1 and the charge voltage of the rechargeable battery BT2 becomes equal to the ratio between the winding voltage of the secondary winding W12 and the winding voltage of the secondary winding W22.

With such an arrangement described above, when the charge voltage of the rechargeable battery BT1 is equal to that of the charge voltage of the rechargeable battery BT2, the winding voltage of the secondary winding W12 is equal to that of the secondary winding W22. When the charge voltage of the rechargeable battery BT1 is lower than the charge voltage of the rechargeable battery BT2, the winding voltage of the secondary winding W12 becomes lower than that of the secondary winding W22. Conversely, when the charge voltage of the rechargeable battery BT1 is higher than that of the rechargeable battery BT2, the winding voltage of the secondary winding W12 becomes higher than that of the secondary winding W22.

With such an arrangement, the secondary winding W12 and the secondary winding W22 are connected in parallel as described above. Accordingly, a current flows between the secondary windings W12 and W22 until the winding voltage of the secondary winding W12 becomes equal to the winding voltage of the secondary winding W22. Thus, such an arrangement is capable of equalizing the charge voltages of the rechargeable batteries BT1 and BT2.

Accordingly, when the charge voltage of the rechargeable battery BT1 is equal to the charge voltage of the rechargeable battery BT2, the winding voltage of the secondary winding W12 becomes equal to that of the secondary winding W22. Thus, no current flows between the secondary winding W12 and the secondary winding W22. Thus, no current flows to either the rechargeable battery BT1 or the rechargeable battery BT2.

When the charge voltage of the rechargeable battery BT1 is lower than that of the rechargeable battery BT2, the winding voltage of the secondary winding W12 becomes lower than that of the secondary winding W22 as described above. Accordingly, a current flows from the secondary winding W22 to the secondary winding W12 until the winding voltage of the secondary winding W12 becomes equal to that of the secondary winding W22, i.e., until the charge voltage of the rechargeable battery BT1 becomes equal to that of the rechargeable battery BT2. Thus, until the charge voltage of the rechargeable battery BT1 becomes equal to that of the rechargeable battery BT2, a current flows from the primary winding W11 to the rechargeable battery BT1, thereby charging the rechargeable battery BT1. Furthermore, until the charge voltage of the rechargeable battery BT1 becomes equal to that of the rechargeable battery BT2, a current flows from the rechargeable battery BT2 to the primary winding W21, thereby discharging the rechargeable battery BT2.

When the charge voltage of the rechargeable battery BT1 is higher than that of the rechargeable battery BT2, the winding voltage of the secondary winding W12 becomes higher than that of the secondary winding W22 as described above. Accordingly, a current flows from the secondary winding W12 to the secondary winding W22 until the winding voltage of the secondary winding W12 becomes equal to that of the secondary winding W22, i.e., until the charge voltage of the rechargeable battery BT1 becomes equal to that of the rechargeable battery BT2. Thus, until the charge voltage of the rechargeable battery BT1 becomes equal to that of the rechargeable battery BT2, a current flows from the rechargeable battery BT1 to the primary winding W11, thereby discharging the rechargeable battery BT1. Furthermore, until the charge voltage of the rechargeable battery BT1 becomes equal to that of the rechargeable battery BT2, a current flows from the primary winding W21 to the rechargeable battery BT2, thereby charging the rechargeable battery BT2.

With the operation described above, when the rechargeable batteries BT1 and BT2 are charged or discharged, such an arrangement allows the charge voltages of the rechargeable batteries BT1 and BT2 to be equalized.

It should be noted that the current that flows through each of the secondary windings W12 and W22 is determined based on the respective number of turns of the primary windings W11 and W21 and the respective number of turns of the secondary windings W12 and W22. Specifically, with the ratio between the respective number of turns of the primary windings W11 and W21 and that of the secondary windings W21 and W22 as 1:n (n represents a desired number that satisfies the relation n>1), with the respective currents that flow through the primary windings W11 and W21 as I1, and with the respective currents that flow through the secondary windings W12 and W22 as I2, the relation represented by the following Expression (4) holds true.

$$I2 = \frac{I1}{n} \qquad \text{[Expression 4]}$$

The cell balance circuit KK described above provides the following advantages.

The cell balance circuit KK is configured to equalize the respective charge voltages of the rechargeable batteries BT1 and BT2 without involving the diodes required by the circuit disclosed in the aforementioned Patent document 1. Furthermore, when the rechargeable batteries BT1 and BT2 are charged or discharged, the cell balance circuit KK is configured to equalize the respective charge voltages of the rechargeable batteries BT1 and BT2. Thus, such an arrangement is capable of equalizing the respective charge voltages of the rechargeable batteries BT1 and BT2 with high precision when the rechargeable batteries BT1 and BT2 are discharged, as well as when the rechargeable batteries BT1 and BT2 are charged, and the cell balance can be stabilized.

Furthermore, the cell balance circuit KK is capable of equalizing the respective charge voltages of the rechargeable batteries BT1 and BT2 without using the respective charge voltages of the rechargeable batteries BT1 and BT2. That is to say, there is no need to monitor the respective charge voltages of the rechargeable batteries BT1 and BT2, thereby providing the cell balance circuit KK with a low cost and a compact size.

Furthermore, the cell balance circuit KK is capable of equalizing the respective charge voltages of the rechargeable batteries BT1 and BT2 when the rechargeable batteries BT1 and BT2 are charged or discharged. Thus, such an arrangement protects the rechargeable batteries BT1 and BT2 from reaching the range of deterioration, thereby suppressing deterioration of the rechargeable batteries BT1 and BT2.

In a case in which a resistor is connected in parallel to each of the multiple rechargeable batteries as described above, such an arrangement has a problem in that the current that can flow through each rechargeable battery is limited by the corresponding resistor. In contrast, the cell balance circuit KK includes the transformers T1 and T2, and does not include such a resistor. The primary windings W11 and W12 and the secondary windings W21 and W22 included in the transformers T1 and T2 each have a very small resistance value as compared with those of the aforementioned resistors. Thus, the transformers T1 and T2 each impose only a very small limit on the current that can flow through each rechargeable battery, as compared with the limit imposed by the aforementioned resistors. Thus, the cell balance circuit KK provides an increased current that can flow through the rechargeable batteries BT1 and BT2, as compared with the aforementioned arrangement in which a resistor is connected in parallel to each of the rechargeable batteries BT1 and BT2.

Furthermore, in the cell balance circuit KK, the transformers T1 and T2 each include an iron core. Thus, such an arrangement allows the transformers T1 and T2 to provide a stable magnetic flux, and the cell balance can be stabilized with higher precision.

Furthermore, in the cell balance circuit KK, the iron core of the transformer T1 and the iron core of the transformer T2 are configured separately. Thus, in a case in which the rechargeable batteries BT1 and BT2 are not arranged in neighboring positions, such an arrangement allows the transformer T1 to be arranged in the vicinity of the rechargeable battery BT1, and allows the transformer T2 to be arranged in the vicinity of the transformer T2. This facilitates the design of the cell balance circuit.

Furthermore, with the cell balance circuit KK, the respective number of turns of the secondary windings W12 and W22 is greater than that of the primary windings W11 and W21. Thus, as represented by the aforementioned Expression (4), such an arrangement allows the respective currents that flow through the secondary windings W12 and W22 to be set to smaller currents than the respective currents that flow through the primary windings W11 and W21. Such an arrangement is capable of reducing energy loss that occurs at the secondary winding W12, energy loss that occurs at the secondary winding W22, and energy loss that occurs between the secondary windings W12 and W22.

Tenth Embodiment

Configuration of Cell Balance Circuit LL

Figure 13:
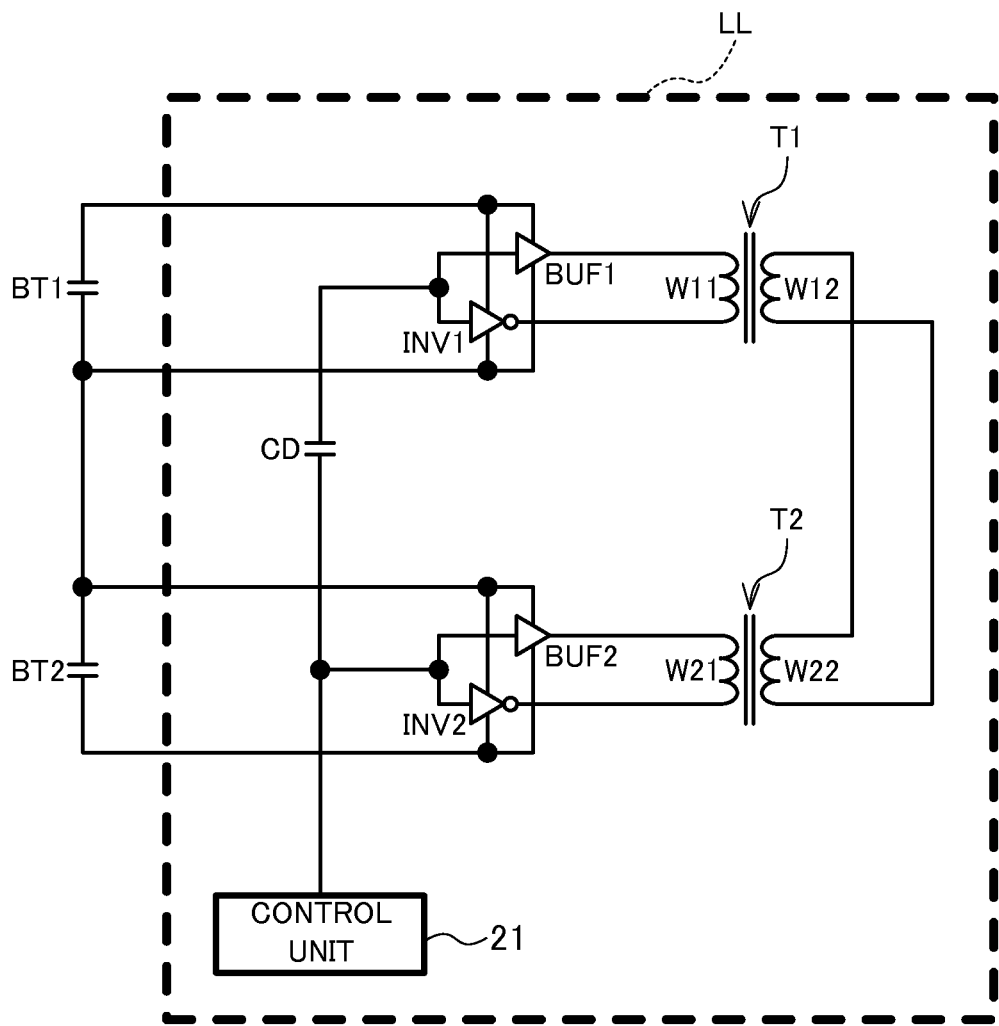
FIG. 13 is a circuit diagram showing a cell balance circuit according to a tenth embodiment of the present invention.

FIG. 13 is a circuit diagram showing a cell balance circuit LL according to a tenth embodiment of the present invention. The cell balance circuit LL has the same configuration as that of the cell balance circuit KK shown in FIG. 12 according to the ninth embodiment of the present invention except that the cell balance circuit LL further includes a control unit 21 and a capacitor CD, includes a buffer BUF1 and an inverter INV1 instead of the switch SW1, and includes a buffer BUF2 and an inverter INV2 instead of the switch SW2. It should be noted that, in the description of the cell balance circuit LL, the same components as those of the cell balance circuit KK are denoted by the same reference symbols, and description thereof will be omitted.

The control unit 21 is connected to the input terminal of the buffer BUF2 and the input terminal of the inverter INV2. The output terminal of the buffer BUF2 is connected to one terminal of the primary winding W21, and the output terminal of the inverter INV2 is connected to the other terminal of the primary winding W21. One terminal of the rechargeable battery BT2 is connected to a higher potential side control terminal of the buffer BUF2 and a higher potential side control terminal of the inverter INV2. Furthermore, the other terminal of the rechargeable battery BT2 is connected to a lower potential side control terminal of the buffer BUF2 and a lower potential side control terminal of the inverter INV2.

In the same way as with the aforementioned buffer BUF2 and inverter INV2, the buffer BUF1 and the inverter INV1 are connected to the control unit 21, the rechargeable battery BT1, and the primary winding W11. It should be noted that control unit 21 is connected to the input terminal of the buffer BUF1 and the input terminal of the inverter INV1 via the capacitor CD.

<Operation of Cell Balance Circuit LL>

When the rechargeable batteries BT1 and BT2 are charged or discharged, the control unit 21 is configured to output a control signal with a duty ratio of 50%. The control signal is input to the input terminals of the buffers BUF1 and BUF2 and the input terminals of the inverters INV1 and INV2. Thus, such an arrangement synchronously controls the buffers BUF1 and BUF2 and the inverters INV1 and INV2.

When the voltage level of the control signal is H level, such an arrangement is configured to control the buffers BUF1 and BUF2 such that their output terminals are connected to their higher potential side control terminals, and to control the inverters INV1 and INV2 such that their output terminals are connected to their lower potential side control terminals. In this state, one terminal of the rechargeable battery BT1 is connected to one terminal of the primary winding W11, and one terminal of the rechargeable battery BT2 is connected to one terminal of the primary winding W21. Furthermore, the other terminal of the rechargeable battery BT1 is connected to the other terminal of the primary winding W11, and the other terminal of the rechargeable battery BT2 is connected to the other terminal of the primary winding W21. Thus, the charge voltage of the rechargeable battery BT1 is applied to the primary winding W11, and the charge voltage of the rechargeable battery BT2 is applied to the primary winding W21.

On the other hand, when the voltage level of the control signal is L level, such an arrangement is configured to control the buffers BUF1 and BUF2 such that their output terminals are connected to their lower potential side control terminals, and to control the inverters INV1 and INV2 such that their output terminals are connected to their higher potential side control terminals. In this state, the aforementioned one terminal of the rechargeable battery BT1 is connected to the aforementioned other terminal of the primary winding W11, and the aforementioned one terminal of the rechargeable battery BT2 is connected to the other terminal of the primary winding W21. Furthermore, the other terminal of the rechargeable battery BT1 is connected to the aforementioned one terminal of the primary winding W11, and the other terminal of the rechargeable battery BT2 is connected to the aforementioned one terminal of the primary winding W21. Thus, the charge voltage of the rechargeable battery BT1 is applied to the primary winding W11, and the charge voltage of the rechargeable battery BT2 is applied to the primary winding W21.

With such an arrangement described above, in the same way as with the aforementioned cell balance circuit KK, a current flows through the rechargeable batteries BT1 and BT2 according to the relation between the charge voltage of the rechargeable battery BT1 and the charge voltage of the rechargeable battery BT2.

It should be noted that the voltage polarity inverts at one terminal of the primary winding W11 with the other terminal thereof as a reference and at one terminal of the primary winding W21 with the other terminal thereof as a reference every time the voltage level of the control signal is switched between H level and L level.

With the cell balance circuit LL described above, such an arrangement provides the following advantages in addition to those provided by the cell balance circuit KK shown in FIG. 12 according to the ninth embodiment of the present invention.

With the cell balance circuit LL, the control unit 21 is configured to output a control signal having a duty ratio of 50%. Thus, such an arrangement provides a first period and a second period with the same time length, such that they are alternately switched. Here, in the first period, one terminal of the rechargeable battery BT1 is connected to one terminal of the primary winding W11, one terminal of the rechargeable battery BT2 is connected to one terminal of the primary winding W21, the other terminal of the rechargeable battery BT1 is connected to the other terminal of the primary winding W11, and the other terminal of the rechargeable battery BT2 is connected to the other terminal of the primary winding W21. On the other hand, in the second period, the aforementioned one terminal of the rechargeable battery BT1 is connected to the other terminal of the primary winding W11, the aforementioned one terminal of the rechargeable battery BT2 is connected to the other terminal of the primary winding W21, the other terminal of the rechargeable battery BT1 is connected to the aforementioned one terminal of the primary winding W11, and the other terminal of the rechargeable battery BT2 is connected to the aforementioned one terminal of the primary winding W21. Thus, such an arrangement is capable of equalizing the respective charge voltages of the rechargeable batteries BT1 and BT2 with higher precision.

Furthermore, with the cell balance circuit LL, the control unit 21 is configured to output a control signal having a duty ratio of 50%, as described above. Thus, in a cyclic manner according to the voltage level of the control signal, the voltage polarity inverts at one terminal of the primary winding W11 with the other terminal thereof as a reference and at one terminal of the primary winding W21 with the other terminal thereof as a reference. Thus, such an arrangement is capable of preventing the transformers T1 and T2 from saturating.

Eleventh Embodiment

Configuration of Cell Balance Circuit MM

Figure 14:
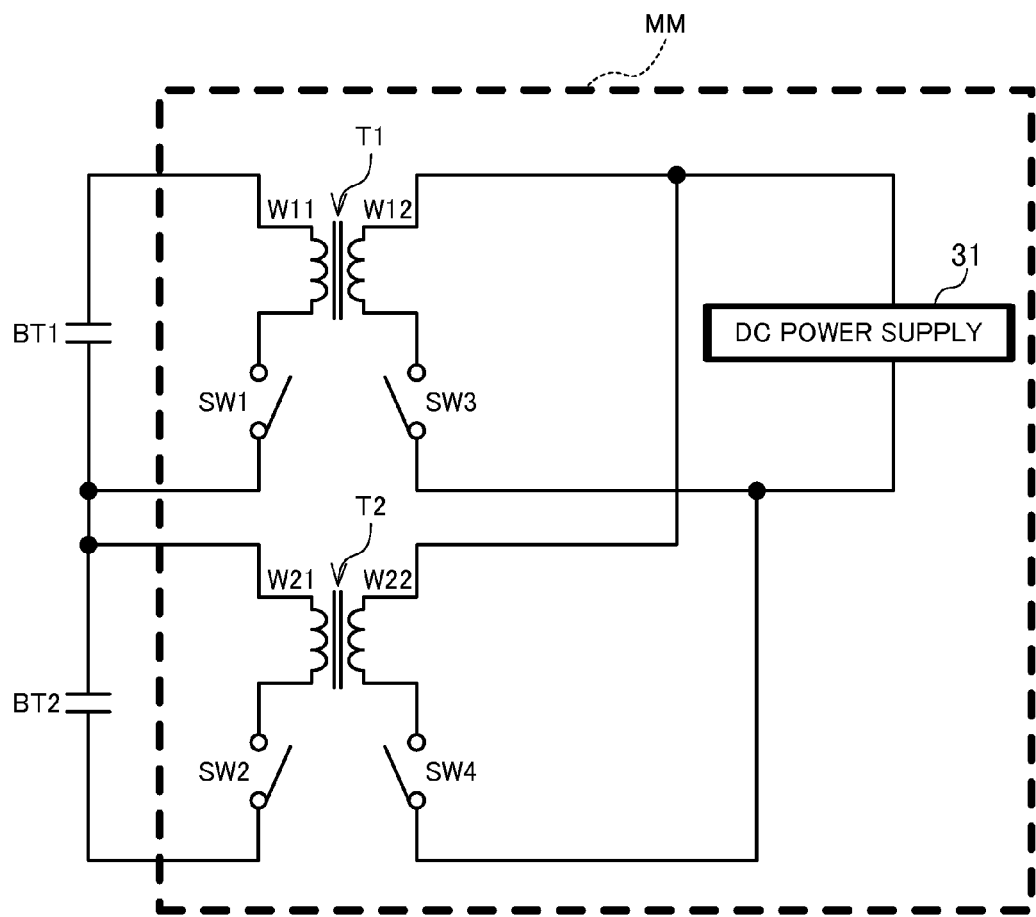
FIG. 14 is a circuit diagram showing a cell balance circuit according to an eleventh embodiment of the present invention.

FIG. 14 is a circuit diagram showing a cell balance circuit MM according to an eleventh embodiment of the present invention. The cell balance circuit MM has the same configuration as that of the cell balance circuit KK shown in FIG. 12 according to the ninth embodiment of the present invention, except that the cell balance circuit MM further includes switches SW3 and SW4 and a DC power supply 31. It should be noted that, in the description of the cell balance circuit MM, the same components as those of the cell balance circuit KK are denoted by the same reference symbols, and description thereof will be omitted.

The DC power supply 31 includes a higher potential side terminal and a lower potential side terminal, and is configured to output a DC voltage with the electric potential at the lower potential side terminal as a reference. The DC power supply 31 is configured as a component which is capable of outputting a DC voltage such as a capacitor, a DC power supply, or the like.

The higher potential side terminal of the DC power supply 31 is connected to one terminal of the secondary winding W12 and one terminal of the secondary winding W22. The lower potential side terminal of the DC power supply 31 is connected to the other terminal of the secondary winding W12 via the switch SW3, and is connected to the other terminal of the secondary winding W22 via the switch SW4. The switches SW3 and SW4 are each configured as a MOSFET, an IGBT, or a BJT, for example.

<Operation of Cell Balance Circuit MM>

In the same way as with the cell balance circuit KK, when the rechargeable batteries BT1 and BT2 are charged or discharged, when there is a difference in the charge voltage between the rechargeable batteries BT1 and BT2, the cell balance circuit MM is configured to supply a current flow to the rechargeable batteries BT1 and BT2, so as to equalize the respective charge voltages of the rechargeable batteries BT1 and BT2. Description will be made below regarding a specific operation of the cell balance circuit MM.

When the rechargeable batteries BT1 and BT2 are charged or discharged, the cell balance circuit MM is configured to instruct an unshown control unit to synchronously control the switches SW1 and SW3, and to synchronously control the switches SW2 and SW4. When the switch SW1 enters the on state, the charge voltage of the rechargeable battery BT1 is applied to the primary winding W11. On the other hand, when the switch SW2 enters the on state, the charge voltage of the rechargeable battery BT2 is applied to the primary winding W21.

When the charge voltage of the rechargeable battery BT1 is applied to the primary winding W11, a magnetic flux occurs in the primary winding W11, which passes into the secondary winding W12. Thus, an electromotive force occurs in the secondary winding W12 as represented by the aforementioned Expression (1). The electromotive force that occurs in the secondary winding W12 changes according to a change in the charge voltage of the rechargeable battery BT1.

As with the secondary winding W12 described above, when the charge voltage of the rechargeable battery BT2 is applied to the primary winding W21, a magnetic flux occurs in the primary winding W21, which passes into the secondary winding W22. Thus, an electromotive force occurs in the secondary winding W22 as represented by the aforementioned Expression (1). The electromotive force that occurs in the secondary winding W22 changes according to a change in the charge voltage of the rechargeable battery BT2.

With such an arrangement, as described above, the switch SW3 is controlled synchronously with the switch SW1 as described above. When the switch SW3 comes to be in the on state, the output voltage of the DC power supply 31 is applied to the secondary winding W12. Thus, a current flows occurs between the secondary winding W12 and the DC power supply 31 until the winding voltage of the secondary winding W12 becomes equal to the output voltage of the DC power supply 31. As a result, the ratio between the charge voltage of the rechargeable battery BT1 and the output voltage of the DC power supply 31 becomes equal to the turn ratio between the primary winding W11 and the secondary winding W12.

Furthermore, the switch SW4 is controlled synchronously with the switch SW2 as described above. When the switch SW4 comes to be in the on state, the output voltage of the DC power supply 31 is applied to the secondary winding W22. Thus, a current flows between the secondary winding W22 and the DC power supply 31 until the winding voltage of the secondary winding W22 becomes equal to the output voltage of the DC power supply 31. As a result, the ratio between the charge voltage of the rechargeable battery BT2 and the output voltage of the DC power supply 31 becomes equal to the turn ratio between the primary winding W21 and the secondary winding W22.

With such an arrangement, the number of turns of the primary winding W11 is equal to that of the primary winding W21. Furthermore, the number of turns of the secondary winding W12 is equal to that of the secondary winding W22. Thus, the turn ratio between the primary winding W11 and the secondary winding W12 is equal to the turn ratio between the primary winding W21 and the secondary winding W22. Thus, the ratio between the charge voltage of the secondary winding BT1 and the output voltage of the DC power supply 31 becomes equal to the ratio between the charge voltage of the rechargeable battery BT2 and the output voltage of the DC power supply 31. As a result, the charge voltage of the rechargeable battery BT1 becomes equal to that of the rechargeable battery BT2.

With the cell balance circuit MM described above, such an arrangement provides the same advantages as those provided by the cell balance circuit KK shown in FIG. 12 according to the ninth embodiment of the present invention.

Twelfth Embodiment

Configuration of cell balance circuit NN

Figure 15:
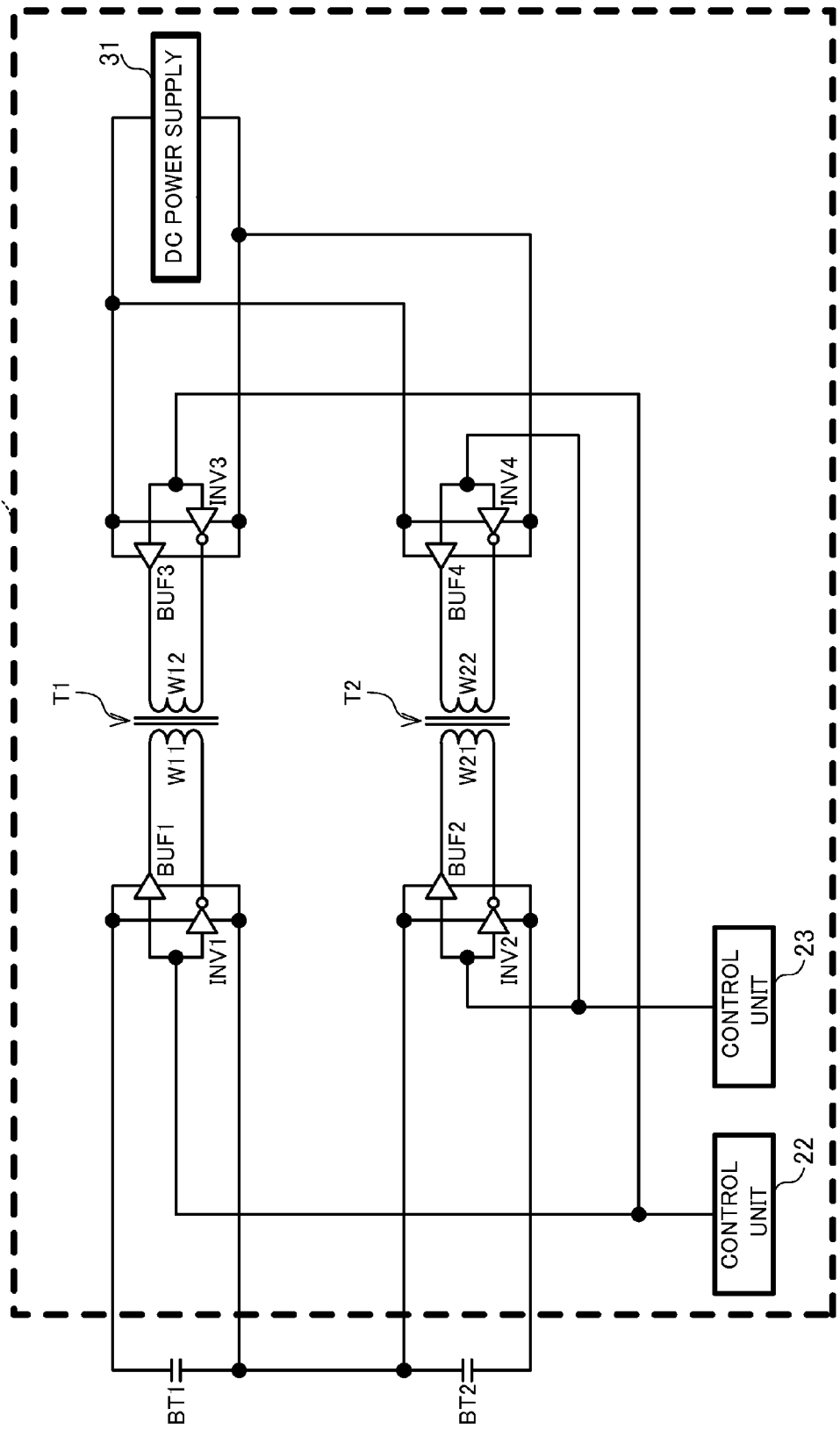
FIG. 15 is a circuit diagram showing a cell balance circuit according to a twelfth embodiment of the present invention.

FIG. 15 is a circuit diagram showing a cell balance circuit NN according to a twelfth embodiment of the present invention. The cell balance circuit NN has the same configuration as that of the cell balance circuit MM shown in FIG. 14 according to the eleventh embodiment of the present invention except that the cell balance circuit NN further includes control units 22 and 23, includes a buffer BUF1 and an inverter INV1 instead of the switch SW1, includes a buffer BUF2 and an inverter INV2 instead of the switch SW2, includes a buffer BUF3 and an inverter INV3 instead of the switch SW3, and includes a buffer BUF4 and an inverter INV4 instead of the switch SW4. It should be noted that, in the description of the cell balance circuit NN, the same components as those of the cell balance circuit MM are denoted by the same reference symbols, and description thereof will be omitted.

The control unit 22 is connected to the input terminal of the buffer BUF1 and the input terminal of the inverter INV1. The output terminal of the buffer BUF1 is connected to one terminal of the primary winding W11, and the output terminal of the inverter INV1 is connected to the other terminal of the primary winding W11. One terminal of the rechargeable battery BT1 is connected to the higher potential side control terminal of the buffer BUF1 and the higher potential side control terminal of the inverter INV1. The other terminal of the rechargeable battery BT1 is connected to the lower potential side control terminal of the buffer BUF1 and the lower potential side control terminal of the inverter INV1.

In the same way as with the buffer BUF1 and the inverter INV1 described above, the buffer BUF2 and the inverter INV2 are connected to the control unit 23, the rechargeable battery BT2, and the primary winding W21.

The control unit 22 is connected to the input terminal of the buffer BUF3 and the input terminal of the inverter INV3. The output terminal of the buffer BUF3 is connected to one terminal of the secondary winding W12, and the output terminal of the inverter INV3 is connected to the other terminal of the secondary winding W12. Furthermore, the higher potential side terminal of the DC power supply 31 is connected to the higher potential side control terminal of the buffer BUF3 and the higher potential side control terminal of the inverter INV3. Moreover, the lower potential side terminal of the DC power supply 31 is connected to the lower potential side control terminal of the buffer BUF3 and the lower potential side control terminal of the inverter INV3.

In the same way as with the buffer BUF3 and the inverter INV3 described above, the buffer BUF4 and the inverter INV4 are connected to the control unit 23, the secondary winding W22, and the DC power supply 31.

<Operation of Cell Balance Circuit NN>

When the rechargeable battery BT1 is charged or discharged, the control unit 22 is configured to output a control signal having a duty ratio of 50%. The control signal output from the control unit 22 is input to the input terminals of the buffers BUF1 and BUF3 and to the input terminals of the inverters INV1 and INV3. This allows the buffer BUF1 and BUF3 and inverters INV1 and INV3 to be synchronously controlled.

When the voltage level of the control signal output from the control unit 22 is H level, the buffer BUF1 is switched such that its output terminal is connected to its higher potential side control terminal, and the inverter INV1 is switched such that its output terminal is connected to its lower potential side control terminal. In this state, one terminal of the rechargeable battery BT1 is connected to one terminal of the primary winding W11, and the other terminal of the rechargeable battery BT1 is connected to the other terminal of primary winding W11. As a result, the charge voltage of the rechargeable battery BT1 is applied to the primary winding W11.

On the other hand, when the voltage level of the control signal output from the control unit 22 is L level, the buffer BUF1 is switched such that its output terminal is connected to its lower potential side control terminal, and the inverter INV1 is switched such that its output terminal is connected to its higher potential side control terminal. In this state, the aforementioned one terminal of the rechargeable battery BT1 is connected to the other terminal of the primary winding W11. Furthermore, the other terminal of the rechargeable battery BT1 is connected to the aforementioned one terminal of the primary winding W11. As a result, the charge voltage of the rechargeable battery BT1 is applied to the primary winding W11.

It should be noted that the voltage polarity inverts at one terminal of the primary winding W11 with the other terminal thereof as a reference, every time the voltage level of the control signal output from the control unit 22 is switched between H level and L level. Thus, the voltage polarity inverts at one terminal of the secondary winding W12 with the other terminal thereof as a reference, every time the voltage level of the control signal output from the control unit 22 is switched between H level and L level.

Furthermore, when the voltage level of the control signal output from the control unit 22 is H level, the buffer BUF3 is switched such that its output terminal is connected to its higher potential side control terminal, and the inverter INV3 is switched such that its output terminal is connected to its lower potential side control terminal. In this state, one terminal of the secondary winding W12 is connected to the higher potential side terminal of the DC power supply 31, and the other terminal of the secondary winding W12 is connected to the lower potential side terminal of the DC power supply 31. As a result, the output voltage of the DC power supply 31 is applied to the secondary winding W12.

On the other hand, when the voltage level of the control signal output from the control unit 22 is L level, the buffer BUF3 is switched such that its output terminal is connected to its lower potential side control terminal, and the inverter INV3 is switched such that its output terminal is connected to its higher potential side control terminal. In this state, the aforementioned one terminal of the secondary winding W12 is connected to the lower potential side terminal of the DC power supply 31, and the other terminal of the secondary winding W12 is connected to the higher potential side terminal of the DC power supply 31. As a result, the output voltage of the DC power supply 31 is applied to the secondary winding W12.

It should be noted that the voltage polarity inverts at one terminal of the secondary winding W12 with the other terminal thereof as a reference, every time the voltage level of the control signal output from the control unit 22 is switched between H level and L level. However, every time the voltage level of the control signal output from the control unit 22 is switched between H level and L level, the connection between the secondary winding W12 and the DC power supply 31 is also switched between the state in which one terminal of the secondary winding W12 is connected to the higher potential side terminal of the DC power supply 31 and the other terminal of the secondary winding W12 is connected to the lower potential side terminal of the DC power supply 31 and the state in which the aforementioned one terminal of the secondary winding W12 is connected to the lower potential side terminal of the DC power supply 31 and the other terminal of the secondary winding W12 is connected to the higher potential side terminal of the DC power supply 31. Thus, the higher potential side terminal from among the aforementioned one terminal or the other terminal of the secondary winding W12 is connected to the higher potential side terminal of the DC power supply 31, and the lower potential side terminal from among the aforementioned one terminal or the other terminal of the secondary winding W12 is connected to the lower potential side terminal of the DC power supply 31, regardless of the switching of the voltage polarity at the one terminal of the secondary winding W12 with the other terminal thereof as a reference according to the voltage level of the control signal output from the control unit 22.

Furthermore, in the same way as with the control unit 22, when the rechargeable battery BT2 is charged or discharged, the control unit 23 is configured to output a control signal having a duty ratio of 50%. The control signal output from the control unit 23 is input to the input terminals of the buffers BUF2 and BUF4 and to the input terminals of the inverters INV2 and INV4. Thus, such an arrangement allows the buffers BUF2 and BUF4 and the inverters INV2 and INV4 to be synchronously controlled.

The buffers BUF2 and BUF4 and the inverters INV2 and INV4, which are each configured to receive, via their respective input terminals, the control signal output from the control unit 23, operate in the same way as with the buffers BUF1 and BUF3 and the inverters INV1 and INV3, which are each configured to receive, via their respective input terminals, the control signal output from the control unit 22.

In this state, the charge voltage of the rechargeable battery BT2 is applied to the primary winding W21. Thus, the voltage polarity inverts at one terminal of the primary winding W21 with the other terminal thereof as a reference, every time the voltage level of the control signal output from the control unit 23 is switched between H level and L level. As a result, the voltage polarity inverts at one terminal of the secondary winding W22 with the other terminal thereof as a reference, every time the voltage level of the control signal output from the control unit 23 is switched between H level and L level.

Furthermore, every time the voltage level of the control signal output from the control unit 23 is switched between H level and L level, the connection between the secondary winding W22 and the DC power supply 31 is also switched between the state in which one terminal of the secondary winding W22 is connected to the higher potential side terminal of the DC power supply 31 and the other terminal of the secondary winding W22 is connected to the lower potential side terminal of the DC power supply 31 and the state in which the aforementioned one terminal of the secondary winding W22 is connected to the lower potential side terminal of the DC power supply 31 and the other terminal of the secondary winding W22 is connected to the higher potential side terminal of the DC power supply 31. Thus, the higher potential side terminal from among the aforementioned one terminal or the other terminal of the secondary winding W22 is connected to the higher potential side terminal of the DC power supply 31, and the lower potential side terminal from among the aforementioned one terminal or the other terminal of the secondary winding W22 is connected to the lower potential side terminal of the DC power supply 31, regardless of the switching of the voltage polarity at one terminal of the secondary winding W22 with the other terminal thereof as a reference according to the voltage level of the control signal output from the control unit 23.

With the cell balance circuit NN described above, such an arrangement provides the following advantages in addition to the aforementioned advantages provided by the cell balance circuit MM shown in FIG. 14 according to the eleventh embodiment of the present invention.

With the cell balance circuit NN, regardless of the voltage level of the control signal output from the control unit 22, such an arrangement is configured to maintain a state in which the higher potential terminal from among the two terminals of the secondary winding W12 is connected to the higher potential side terminal of the DC power supply 31, and the lower potential terminal (the other terminal of the secondary winding W12) is connected to the lower potential side terminal of the DC power supply 31. As a result, the connection between the secondary winding W12 and the DC power supply 31 is configured as a DC circuit configured such that the DC power supply 31 supplies a DC voltage to the secondary winding W12. If AC power is supplied to the winding W12, such an arrangement is affected by the inductance component of the winding. However, with the present embodiment, DC power is supplied to the secondary winding W12, thereby suppressing the influence of the inductance component of the wiring. Also, such an arrangement allows the wiring between the secondary winding W12 and the DC power supply 31 to be lengthened. Furthermore, the wiring that connects the secondary winding W22 and the DC power supply 31 is also configured as a DC circuit as with the wiring that connects the secondary winding W12 and the DC power supply 31. Thus, such an arrangement also allows the wiring that connects the secondary winding W22 and the DC power supply 31 to be lengthened. Such an arrangement described above facilitates the design of the cell balance circuit NN.

Furthermore, as described above, with the cell balance circuit NN, the wiring that connects the secondary winding W12 and the DC power supply 31 and the wiring that connects the secondary winding W22 and the DC power supply 31 are each configured as a DC circuit configured to supply a DC voltage to the secondary winding. With such an arrangement, by synchronously controlling the buffers BUF1 and BUF3 and the inverters INV1 and INV3, and by synchronously controlling the buffers BUF2 and BUF4 and the inverters INV2 and INV4, such an arrangement allows asynchronous operation of the set of the buffers BUF1 and BU3 and the inverters INV1 and INV3 and the set of the buffers BUF2 and BUF4 and the inverters INV2 and INV4. Thus, there is no need to take into account the equalization of a delay that occurs due to the wiring that connects the control unit 22 and the buffers BUF1 and BUF3 and the inverters INV1 and INV3 with a delay that occurs due to the wiring that connects the control unit 23 and the buffers BUF2 and BUF4 and the inverters INV2 and INV4. Such an arrangement allows the wiring to have an increased length. Furthermore, such an arrangement allows the control units 22 and 23 to perform a control operation in a simple manner. Thus, such an arrangement further facilitates the design of the cell balance circuit NN.

Furthermore, with the cell balance circuit NN, the control unit 22 is configured to output a control signal having a duty ratio of 50%. Accordingly, the first period and the second period with the same time length are alternately switched. Thus, such an arrangement allows the connection between the rechargeable battery BT1 and the primary winding W11 to be switched every time a predetermined period of time elapses. Here, in the first period, one terminal of the rechargeable battery BT1 is connected to one terminal of the primary winding W11, the other terminal of the rechargeable battery BT1 is connected to the other terminal of the primary winding W11, one terminal of the secondary winding W12 is connected to the higher potential side terminal of the DC power supply 31, and the other terminal of the secondary winding W12 is connected to the lower potential side terminal of the DC power supply 31. On the other hand, in the second period, the aforementioned one terminal of the rechargeable battery BT1 is connected to the other terminal of the primary winding W11, the other terminal of the rechargeable battery BT1 is connected to the aforementioned one terminal of the primary winding W11, the aforementioned one terminal of the secondary winding W12 is connected to the lower potential side terminal of the DC power supply 31, and the other terminal of the secondary winding W12 is connected to the higher potential side terminal of the DC power supply 31. Furthermore, the control signal output from the control unit 23 has a duty ratio of 50%. Thus, in the same way as the switching of the connection between the rechargeable battery BT1 and the primary winding W11, such an arrangement allows the connection between the rechargeable battery BT2 and the primary winding W21 to be switched every time a predetermined period of time elapses. Such an arrangement described above allows the respective charge voltages of the rechargeable batteries BT1 and BT2 to be equalized with higher precision.

With the cell balance circuit NN, as described above, the control signal output from the control unit 22 also has a duty ratio of 50%. Accordingly, according to the voltage level of the control signal output from the control unit 22, the voltage polarity inverts in a cyclic manner at one terminal of the primary winding W11 with the other terminal thereof as a reference. Thus, such an arrangement prevents the transformer T1 from saturating.

Furthermore, with the cell balance circuit NN, as described above, the control signal output from the control unit 23 also has a duty ratio of 50%. Accordingly, according to the voltage level of the control signal output from the control unit 23, the voltage polarity inverts in a cyclic manner at one terminal of the primary winding W21 with the other terminal thereof as a reference. Thus, such an arrangement prevents the transformer T2 from saturating.

Thirteenth Embodiment

Configuration of Cell Balance Circuit PP

Figure 16:
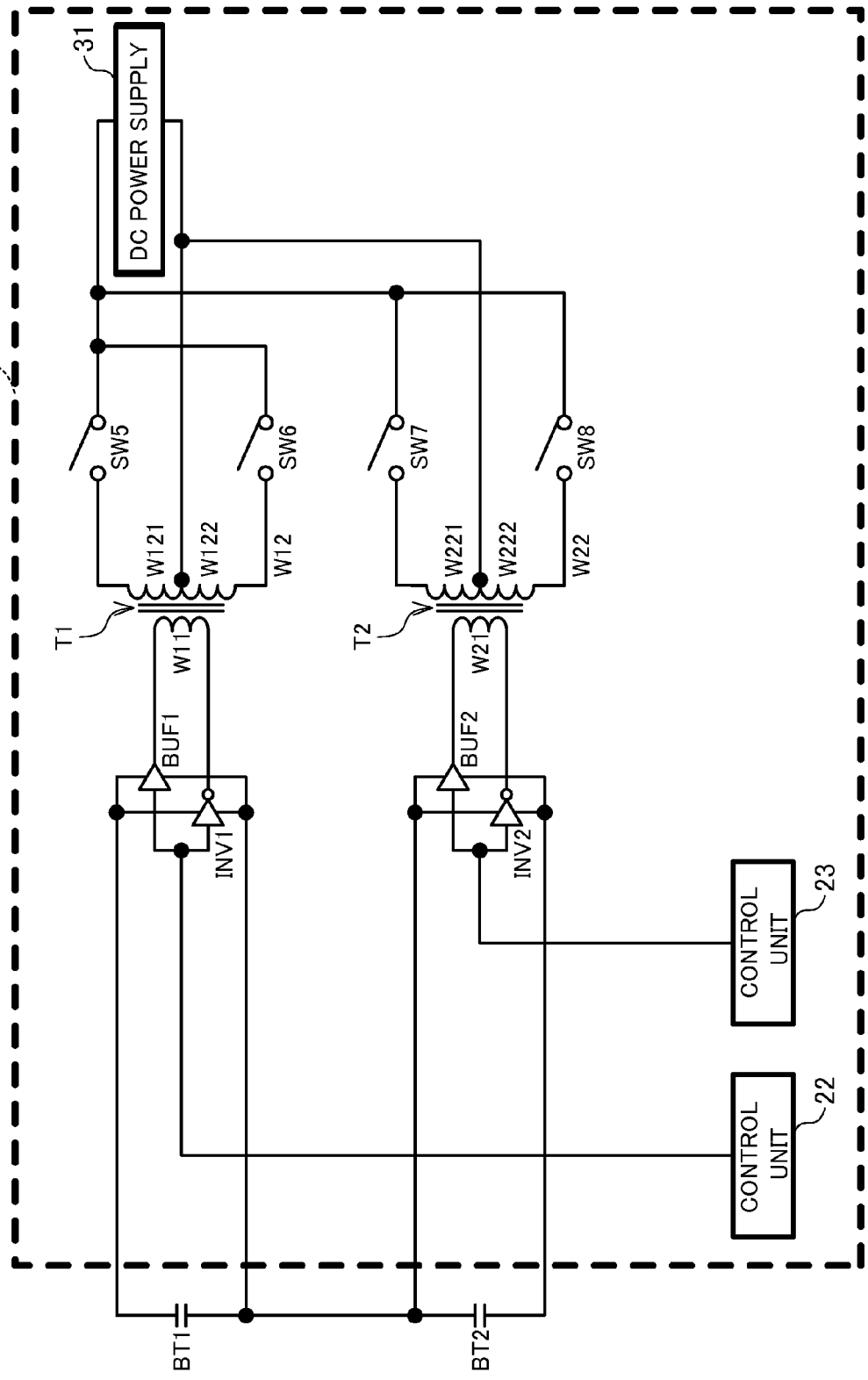
FIG. 16 is a circuit diagram showing a cell balance circuit according to a thirteenth embodiment of the present invention.

FIG. 16 is a circuit diagram showing a cell balance circuit PP according to a thirteenth embodiment of the present invention. The cell balance circuit PP has the same configuration as that of the cell balance circuit NN shown in FIG. 15 according to the twelfth embodiment of the present invention, except that the cell balance circuit PP includes switches SW5 and SW6 instead of the buffer BUF3 and the inverter INV3, includes switches SW7 and SW8 instead of the buffer BUF4 and the inverter INV4, and is provided with an intermediate node at each of the secondary windings W12 and W22. It should be noted that, in the description of the cell balance circuit PP, the same components as those of the cell balance circuit NN are denoted by the same reference symbols, and description thereof will be omitted.

The higher potential side terminal of the DC power supply 31 is connected to one terminal of the secondary winding W12 via the switch SW5, and is connected to the other terminal of the secondary winding W12 via the switch SW6. Furthermore, the higher potential side terminal of the DC power supply 31 is connected to one terminal of the secondary winding W22 via the switch SW7, and is connected to the other terminal of the secondary winding W22 via the switch SW8. The switches SW5 through SW8 are each configured as a MOSFET, IGBT, BJT, or the like, for example. The lower potential side terminal of the DC power supply 31 is connected to the intermediate node of the secondary winding W12 and the intermediate node of the secondary winding W22.

It should be noted that, for ease of description, description will be made regarding an arrangement in which the secondary winding W12 is configured as a combination of a first secondary winding W121 and a second secondary winding W122, where one terminal of the first secondary winding W121 also functions as the aforementioned one terminal of the second winding W12, the other terminal of the second secondary winding W122 also functions as the other terminal of the second winding W12, and the other terminal of the first secondary winding W121 and the aforementioned one terminal of the second secondary winding W122 each function as the intermediate node of the secondary winding W12. Furthermore, description will be made assuming that the secondary winding W22 is configured as a combination of a first secondary winding W221 and a second secondary winding W222, where one terminal of the first secondary winding W221 also functions as the aforementioned one terminal of the secondary winding W22, the other terminal of the second secondary winding W222 also functions as the other terminal of the secondary winding W22, and the other terminal of the first secondary winding W221 and one terminal of the second secondary winding W222 also function as the intermediate node of the secondary winding W22.

Then, it will be assumed that the first secondary windings W121 and W221 and the second secondary windings W122 and W222 are each configured to have an equal number of turns, which is greater than that of each of the first windings W11 and W21.

<Operation of Cell Balance Circuit PP]

As with the cell balance circuit NN, when the rechargeable batteries BT1 and BT2 are charged or discharged, when there is a difference in the charge voltage between the rechargeable batteries BT1 and BT2, the cell balance circuit PP is configured to supply a current flow to the rechargeable batteries BT1 and BT2 so as to equalize the respective charge voltages of the rechargeable batteries BT1 and BT2. However, the operation of the secondary side of the transformers T1 and T2 differs from that of the cell balance circuit NN.

Specifically, regarding the primary side of the transformer T1, as with the cell balance circuit NN, when the rechargeable battery BT1 is charged or discharged, the control unit 22 is configured to output a control signal having a duty ratio of 50% so as to synchronously control the buffer BUF1 and the inverter INV1. With such an arrangement, the electromotive force that occurs in the first secondary winding W121 and the electromotive force that occurs in the second secondary winding W122 each change according to a change in the charge voltage of the rechargeable battery BT1. Furthermore, the electromotive force that occurs in the first secondary winding W121 becomes equal to the electromotive force that occurs in the second secondary winding W122.

On the other hand, regarding the secondary side of the transformer T1, when the rechargeable battery BT1 is charged or discharged, the control unit 22 is configured to control the switches SW5 and SW6 synchronously with the buffer BUF1 and the inverter INV1.

More specifically, when the electric potential at the aforementioned one terminal of the first secondary winding W121 becomes higher than that of the other terminal thereof according to the control operation of the buffer BUF1 and the inverter INV1, the electric potential at the aforementioned one terminal of the second secondary winding W122 becomes higher than that of the other terminal thereof. In this case, the switch SW5 is turned on, and the switch SW6 is turned off. Thus, the higher potential side terminal of the DC power supply 31 is connected to the aforementioned one terminal of the first secondary winding W121, which is the higher potential terminal from among the aforementioned one terminal of the first secondary winding W121 and the other terminal of the second secondary winding W122. As a result, the output voltage of the DC power supply 31 is applied to the first secondary winding W121.

On the other hand, when the electric potential at the aforementioned one terminal of the first secondary winding W121 becomes lower than that of the other terminal thereof according to the control operation of the buffer BUF1 and the inverter INV1, the electric potential at the aforementioned one terminal of the second secondary winding W122 becomes lower than that of the other terminal thereof. In this case, the switch SW5 is turned off, and the switch SW6 is turned on. In this case, the other terminal of the second secondary winding W122, which is the higher potential terminal from among the aforementioned one terminal of the first secondary winding W121 and the other terminal of the second secondary winding W122. As a result, the output voltage of the DC power supply 31 is applied to the second secondary winding W122.

With such an arrangement described above, the higher potential side terminal of the DC power supply 31 is connected to the terminal with a higher electric potential from among the aforementioned one terminal of the secondary winding W12 and the other terminal thereof, and the lower potential side terminal of the DC power supply 31 is connected to the terminal with a lower electric potential from among those, regardless of the switching of the voltage polarity at one terminal of the secondary winding W12 with the other terminal thereof as a reference according to the voltage level of the control signal output from the control unit 22.

The circuit comprising the buffer BUF2, the inverter INV2, and the switches SW7 and SW8 is configured to be controlled by the control unit 23 in the same way as with the circuit comprising the buffer BUF1, the inverter INV1, and the switches SW5 and SW6, as described above. With such an arrangement, the higher potential side terminal of the DC power supply 31 is connected to the terminal with a higher electric potential from among the aforementioned one terminal of the secondary winding W22 and the other terminal thereof, and the lower potential side terminal of the DC power supply 31 is connected to the terminal with a lower electric potential from among those, regardless of the switching of the voltage polarity at one terminal of the secondary winding W22 with the other terminal thereof as a reference according to the voltage level of the control signal output from the control unit 23.

With the cell balance circuit PP described above, such an arrangement provides the same advantages as those provided by the cell balance circuit NN shown in FIG. 15 according to the twelfth embodiment of the present invention.

The present invention is by no means intended to be restricted to the aforementioned embodiments. Rather, various modifications and applications may be made without departing the technical scope of the present invention.

Examples of circuits that can be employed as a non-resonant converter include a full-bridge circuit, a half-bridge circuit, a forward circuit, a push-pull circuit, and an active clamp forward circuit, which have been described in the aforementioned embodiments. However, the present invention is not restricted to such an arrangement. For example, other kinds of non-resonant converters may be employed, examples of which include a flyback circuit.

Description has been mad in the aforementioned embodiments regarding an arrangement in which two rechargeable batteries are connected in series. However, the present invention is not restricted to such an arrangement. Also, the cell balance circuit according to the present invention can be applied to an arrangement in which four rechargeable batteries are connected in series, and an arrangement in which five rechargeable batteries are connected in series, for example.

Description has been made in the aforementioned embodiments regarding an arrangement in which the cell balance circuit and the rechargeable batteries are configured separately. However, the present invention is not restricted to such an arrangement. Also, the cell balance circuit and the rechargeable batteries may be monolithically configured as a single unit.

Description has been made in the aforementioned first through eighth embodiments regarding an arrangement in which the primary winding Wa and the secondary winding Wb are configured such that each winding is wound around the same iron core. However, the present invention is not restricted to such an arrangement. Also, the primary winding Wa and the secondary winding Wb may have no iron core. Also, the primary winding Wa and the secondary winding Wb may be configured such that they are each wound around separate iron cores. Description has been made in the aforementioned ninth through thirteenth embodiments regarding an arrangement in which the transformer T1 and the transformer T2 each include mutually separate iron cores. However, the present invention is not restricted to such an arrangement. For example, the transformers T1 and T2 may each be configured to have no iron core.

REFERENCE MARKS IN THE DRAWINGS

1: cell balance circuit
21, 22, 23: control unit
31: DC power supply
AA, AB, BB, CC, DD, EE, FF, GG, HH, JJ, KK, LL, MM, NN, PP: cell balance circuit
BT1, BT2, BT3, BTn, BT(n+1): rechargeable battery
BUF1, BUF2, BUF3, BUF4: buffer
INV1, INV2, INV3, INV4: inverter
Q1, Q2, Q3, Q4, Q5, Q6, Q7, Q8: switch element
SW1, SW2, SW3, SW4, SW5, SW6, SW7, SW8, Sa, Sb, Sc, Sd: switch
T, T1, T2: transformer
Wa: primary winding
Wb: secondary winding
W11, W21: primary winding
W12, W22: secondary winding
W121, W221: first secondary winding
W122, W222: second secondary winding

The invention claimed is:

1. A cell balance apparatus configured to equalize respective charge voltages of a first rechargeable battery, a second rechargeable battery and a third rechargeable battery, the cell balance circuit comprising:
a first cell balance circuit configured to equalize respective charge voltages of the first rechargeable battery and the second rechargeable battery; and
a second cell balance circuit configured to equalize respective charge voltages of the second rechargeable battery and the third rechargeable battery;
the first cell balance circuit comprising:
a first transformer comprising a primary winding arranged so as to form a set with the first rechargeable battery and a secondary winding arranged so as to form a set with the second rechargeable battery; and
a first switching unit configured to control a state of whether or not a charge voltage of the first rechargeable battery is applied to the primary winding,
wherein the first switching unit comprises a first switch, a second switch, a third switch, and a fourth switch, and the switching unit is configured as a non-resonant circuit,
and wherein a second terminal of the primary winding and a first terminal of the secondary winding are each connected to a second terminal of the first rechargeable battery, and are each connected to a first terminal of the second rechargeable battery,
and wherein the primary winding is arranged such that a first terminal thereof can be connected to a first terminal of the first rechargeable battery via the first switch, and such that the first terminal thereof can be connected to a second terminal of the second rechargeable battery via the second switch, and wherein the secondary winding is arranged such that a second terminal thereof can be connected to the first terminal of the first rechargeable battery via the third switch, and such that the second terminal thereof can be connected to the second terminal of the second rechargeable battery via the fourth switch, and wherein the first switching unit alternately switches on and off the first switch together with the fourth switch and the second switch together with the third switch when the first and second rechargeable batteries are charged or otherwise discharged;

the second cell balance circuit comprising:

a second transformer comprising a third winding arranged so as to form a set with the second rechargeable battery and a fourth winding arranged so as to form a set with the third rechargeable battery; and a second switching unit configured to control a state of whether or not a charge voltage of the second rechargeable battery is applied to the third winding, wherein the second switching unit comprises a fifth switch, a sixth switch, a seventh switch, and an eighth switch, and the switching unit is configured as a non-resonant circuit, and wherein a second terminal of the third winding and a first terminal of the fourth winding are each connected to the second terminal of the second rechargeable battery, and are each connected to a first terminal of the third rechargeable battery, and wherein the third winding is arranged such that a first terminal thereof can be connected to the first terminal of the second rechargeable battery via the fifth switch, and such that the first terminal thereof can be connected to a second terminal of the third rechargeable battery via the sixth switch, and wherein the fourth winding is arranged such that a second terminal thereof can be connected to the first terminal of the second rechargeable battery via the seventh switch, and such that the second terminal thereof can be connected to the second terminal of the third rechargeable battery via the eighth switch, and wherein, the second switching unit alternately switches on and off the fifth switch together with the eighth switch and the sixth switch together with the seventh switch when the second and third rechargeable batteries are charged or otherwise discharged.

2. The cell balance apparatus according to claim 1, wherein the number of turns of the primary winding and that of the secondary winding are equal to that of the third winding.

3. The cell balance apparatus according to claim 1, wherein the first cell balance circuit is monolithically configured with the first rechargeable battery, and the second cell balance circuit is monolithically configured with the second rechargeable battery.

4. The cell balance apparatus according to claim 1, wherein the primary winding and the secondary winding are each configured so as to be wound around a first iron core, and the third winding and the fourth winding are each configured so as to be wound around a second iron core.

5. The cell balance apparatus according to claim 1, wherein switching of the first switch, the second switch, the third switch, and the fourth switch, and switching of the fifth switch, the sixth switch, the seventh switch, and the eighth switch are controlled in an asynchronous manner.

* * * * *